(12) United States Patent
Yamamoto et al.

(10) Patent No.: US 11,789,564 B2
(45) Date of Patent: Oct. 17, 2023

(54) TOUCH PANEL SYSTEM, DISPLAY DEVICE, AND METHOD FOR CONTROLLING TOUCH PANEL SYSTEM

(71) Applicant: SHARP KABUSHIKI KAISHA, Sakai (JP)

(72) Inventors: Takuma Yamamoto, Sakai (JP); Hiroshi Fukushima, Sakai (JP); Kazutoshi Kida, Sakai (JP); Takenori Maruyama, Sakai (JP); Shinji Yamagishi, Sakai (JP); Yasuhiro Sugita, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 22 days.

(21) Appl. No.: 17/518,834

(22) Filed: Nov. 4, 2021

(65) Prior Publication Data

US 2022/0164060 A1 May 26, 2022

(30) Foreign Application Priority Data

Nov. 24, 2020 (JP) ................................. 2020-194658

(51) Int. Cl.
*G06F 3/041* (2006.01)
*G06F 3/044* (2006.01)

(52) U.S. Cl.
CPC .......... *G06F 3/0418* (2013.01); *G06F 3/0414* (2013.01); *G06F 3/0447* (2019.05)

(58) Field of Classification Search
CPC .... G06F 3/0418; G06F 3/0414; G06F 3/0447; G06F 3/0448; G06F 2203/04107; G06F 3/0445; G06F 3/0446
See application file for complete search history.

(56) References Cited

U.S. PATENT DOCUMENTS 9,619,068 B2 4/2017 Kim et al.
2010/0258361 A1 10/2010 Yamauchi et al.
(Continued)

FOREIGN PATENT DOCUMENTS

JP 2009-169697 A 7/2009
JP 2014-179035 A 9/2014
(Continued)

OTHER PUBLICATIONS

Non-Final Rejection of U.S. Appl. No. 17/477,477 dated Sep. 13, 2022.
(Continued)

*Primary Examiner* — Bryan Earles
(74) *Attorney, Agent, or Firm* — ScienBiziP, P.C.

(57) ABSTRACT

A touch panel system includes an electrostatic capacitance type touch panel including a drive electrode, a position detection electrode, and a pressing force detection electrode; and a controller configured to provide a drive signal to the drive electrode and acquire a position signal value from the position detection electrode and a pressing force signal value from the pressing force detection electrode. The controller detects a position of a pointer based on the position signal value, and acquires a pressing force generated by the pointer based on a rate of change of a smoothed value of the pressing force value based on the pressing force signal value.

11 Claims, 18 Drawing Sheets

(56) References Cited

U.S. PATENT DOCUMENTS

| | | | |
|---|---|---|---|
| 2014/0292699 A1* | 10/2014 | Ando | G06F 3/0418 345/173 |
| 2015/0002459 A1 | 1/2015 | Watanabe et al. | |
| 2015/0212633 A1 | 7/2015 | Yamagishi et al. | |
| 2016/0291729 A1 | 10/2016 | Schardt et al. | |
| 2016/0357331 A1 | 12/2016 | Kano et al. | |
| 2017/0052074 A1* | 2/2017 | Watazu | G06F 3/00 |
| 2017/0068368 A1 | 3/2017 | Hsiao et al. | |
| 2017/0115768 A1 | 4/2017 | Shih et al. | |
| 2017/0115780 A1 | 4/2017 | Ogikubo | |
| 2018/0067601 A1* | 3/2018 | Winokur | G06F 3/0414 |
| 2019/0102030 A1 | 4/2019 | Kakin Oki et al. | |
| 2019/0339313 A1* | 11/2019 | Vandermeijden | G06F 3/04146 |
| 2020/0133455 A1* | 4/2020 | Sepehr | G06F 3/0414 |
| 2021/0141488 A1 | 5/2021 | Mugiraneza et al. | |
| 2022/0129114 A1 | 4/2022 | Yamagishi et al. | |
| 2022/0155901 A1* | 5/2022 | Osawa | G06F 3/04166 |
| 2022/0164060 A1 | 5/2022 | Yamamoto et al. | |

FOREIGN PATENT DOCUMENTS

| | | |
|---|---|---|
| JP | 2015-011558 A | 1/2015 |
| JP | 2015-075892 A | 4/2015 |
| WO | 2016/009784 A1 | 1/2016 |

OTHER PUBLICATIONS

Final Rejection of U.S. Appl. No. 17/477,477 dated Dec. 29, 2022.
Non-Final Rejection of U.S. Appl. No. 17/722,155 dated Dec. 13, 2022.
Notice of Allowance of U.S. Appl. No. 17/722,155 dated Mar. 29, 2023.

* cited by examiner

TP  TR

| D(-2,-2) | D(-1,-2) | D(0,-2) | D(1,-2) | D(2,-2) |
| --- | --- | --- | --- | --- |
| D(-2,-1) | D(-1,-1) | D(0,-1) | D(1,-1) | D(2,-1) |
| D(-2,0) | D(-1,0) | D(0,0) | D(1,0) | D(2,0) |
| D(-2,1) | D(-1,1) | D(0,1) | D(1,1) | D(2,1) |
| D(-2,2) | D(-1,2) | D(0,2) | D(1,2) | D(2,2) |

| C(-2,-2)<br>=D(-2,-2) | C(-1,-2)<br>=D(-1,-2) | C(0,-2)<br>=D(0,-2) | C(1,-2)<br>=D(1,-2) | C(2,-2)<br>=D(2,-2) |
| --- | --- | --- | --- | --- |
| C(-2,-1)<br>=C(-2,-2)+D(-2,-1) | C(-1,-1)<br>=C(-1,-2)+D(-1,-1) | C(0,-1)<br>=C(0,-2)+D(0,-1) | C(1,-1)<br>=C(1,-2)+D(1,-1) | C(2,-1)<br>=C(2,-1)+D(2,-1) |
| C(-2,0)<br>=C(-2,-1)+D(-2,0) | C(-1,0)<br>=C(-1,-1)+D(-1,0) | C(0,0)<br>=C(0,-1)+D(0,0) | C(1,0)<br>=C(1,-1)+D(1,0) | C(2,0)<br>=C(2,-1)+D(2,0) |
| C(-2,1)<br>=C(-2,0)+D(-2,1) | C(-1,1)<br>=C(-1,0)+D(-1,1) | C(0,1)<br>=C(0,0)+D(0,1) | C(1,1)<br>=C(1,0)+D(1,1) | C(2,1)<br>=C(2,0)+D(2,1) |
| C(-2,2)<br>=C(-2,1)+D(-2,2) | C(-1,2)<br>=C(-1,1)+D(-1,2) | C(0,2)<br>=C(0,1)+D(0,2) | C(1,2)<br>=C(1,1)+D(1,2) | C(2,2)<br>=C(2,1)+D(2,2) |

FIG. 10

| FRAME NUMBER | 1 | 2 | 3 | ... | E-1 | E | E+1 | ... |
|---|---|---|---|---|---|---|---|---|
| BEFORE CORRECTION | A(1) | A(2) | A(3) | ... | A(E-1) | A(E) | A(E+1) | ... |
| AFTER CORRECTION | A(1)×a | A(2)×a | A(3)×a | ... | A(E-1)×a | A(E)×a | A(E+1) | ... |

TOUCH PANEL SYSTEM, DISPLAY DEVICE, AND METHOD FOR CONTROLLING TOUCH PANEL SYSTEM

CROSS-REFERENCE TO RELATED APPLICATIONS

This application claims the benefit of priority to Japanese Patent Application Number 2020-194658 filed on Nov. 24, 2020. The entire contents of the above-identified application are hereby incorporated by reference.

BACKGROUND

Technical Field

The disclosure relates to a touch panel system that detects a position of a pointer, such as a finger or a touch pen, and a pressing force generated by the pointer, a display device provided with the touch panel system, and a method for controlling the touch panel system.

In recent years, touch panel systems have become widespread. A touch panel system includes a drive electrode to which a drive signal is input, and a detection electrode, and is configured to detect a touch of a finger or the like based on a signal value acquired by the detection electrode. Such a touch panel is disclosed in, for example, JP 2015-75892 A.

A pyroelectric body is provided between the drive electrode and the detection electrode in the touch panel system of JP 2015-75892 A. The pyroelectric body has a function of generating voltage by a pyroelectric effect when a heat-dissipating object such as a finger approaches the pyroelectric body and the temperature at a position facing the heat-dissipating object increases. Furthermore, the pyroelectric body has a function of generating voltage by a piezoelectric effect when a finger or the like is in contact with the touch panel. A signal processor provided in the touch panel system determines that the finger or the like has approached the touch panel when a voltage acquired by the detection electrode is equal to or greater than a first threshold value and less than a second threshold value, and that the finger or the like is in contact with the touch panel when the voltage is equal to or greater than the second threshold value. Note that the second threshold value is a value higher than the first threshold value.

SUMMARY

The touch panel system described in JP 2015-75892 A detects approach (position) of a pointer such as a finger by the pyroelectric effect of the pyroelectric body, and contact (pressing force) of the pointer such as a finger is detected by the piezoelectric effect of the pyroelectric body that detects the approach of the pointer. Thus, even when a heat-generating object different from the pointer approaches the pyroelectric body, in this touch panel system, the pyroelectric effect of the pyroelectric body may occur, and the approach of the heat-generating object may be erroneously detected. In addition, in this touch panel system, there is a problem in that the approach (position) of the pointer cannot be detected when the temperature of the pointer and the temperature of the pyroelectric body are equal.

Thus, an electrostatic capacitance type touch panel including a drive electrode, a position detection electrode and a pressing force detection electrode may be provided in the touch panel system, without providing the pyroelectric body. In this electrostatic capacitance type touch panel, the pointer is capacitively coupled with the drive electrode and the position detection electrode, electrostatic capacitance between both these electrodes decreases, and a signal of the position detection electrode changes. The position of the pointer is detected based on the change in the signal of the position detection electrode. In this electrostatic capacitance type touch panel, the drive electrode and the pressing force detection electrode are capacitively coupled with each other, and when the touch panel is pressed by the pointer, a pressure-sensitive material disposed between the drive electrode and the pressing force detection electrode becomes thinner, so that the distance between both electrodes is shortened. As a result, the electrostatic capacitance between both electrodes increases and causes a change in the signal detected at the pressing force detection electrode, so that the pressing force generated by the pointer is detected.

However, in the electrostatic capacitance type touch panel described above, when the pointer approaches the touch panel or lightly touches the touch panel, heat is transferred from the pointer to the pressure-sensitive material, and the temperature of the pressure-sensitive material increases. When the temperature of the pressure-sensitive material increases, the dielectric constant of the pressure-sensitive material changes, and the electrical capacitance between the drive electrode and the pressing force detection electrode changes. As a result, in the electrostatic capacitance type touch panel described above, the pressing force of the pointer may be erroneously detected when the temperature of the pressure-sensitive material (touch panel) changes.

Thus, the present disclosure provides a touch panel system provided with an electrostatic capacitance type touch panel, a display device provided with the touch panel system, and a method for controlling the touch panel system, wherein the electrostatic capacitance type touch panel is capable of accurately detecting the pressing force generated by the pointer even when the temperature of the touch panel is changed, while being capable of both detecting a position of the pointer and detecting the pressing force generated by the pointer.

In order to solve the above-described problems, a touch panel system according to a first aspect of the present disclosure includes: an electrostatic capacitance type touch panel including a drive electrode, a position detection electrode, and a pressing force detection electrode; and a controller configured to provide a drive signal to the drive electrode and acquire signal values from each of the position detection electrode and the pressing force detection electrode, in which the controller detects a position of a pointer based on a position signal value acquired from the position detection electrode, and acquires a pressing force generated by the pointer based on a rate of change of a pressing force signal value acquired from the pressing force detection electrode or a rate of change of a smoothed value of the pressing force signal value.

A method for controlling a touch panel system according to a second aspect is a method for controlling a touch panel system including an electrostatic capacitance type touch panel including a drive electrode, a position detection electrode, and a pressing force detection electrode, the method including providing a drive signal to the drive electrode, acquiring signal values from each of the position detection electrode and the pressing force detection electrode, detecting a position of a pointer based on the signal value acquired from the position detection electrode, and acquiring a pressing force generated by the pointer based on a rate of change of a pressing force value based on the signal value acquired from the pressing force detection electrode or a rate of change of a smoothed value of the pressing force value.

The touch panel system of the above-described configuration and the method for controlling the touch panel system is capable of accurately detecting the pressing force generated by the pointer even when the temperature of the touch panel is changed, while being capable of both detecting the position of the pointer and detecting the pressing force generated by the pointer.

BRIEF DESCRIPTION OF DRAWINGS

The disclosure will be described with reference to the accompanying drawings, wherein like numbers reference like elements.

FIG. 9 is a schematic view (1) illustrating a method for calculating a detailed position of a pointer by the controller.

FIG. 10 is a schematic view (2) illustrating a method for calculating a detailed position of the pointer by the controller.

DESCRIPTION OF EMBODIMENTS

Figure 1:
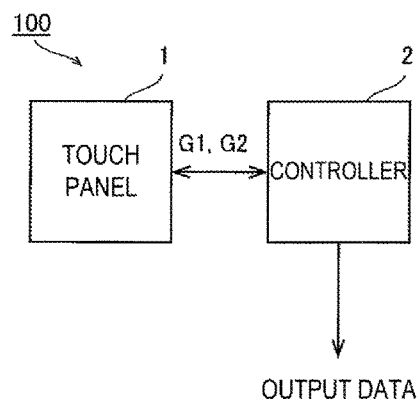
FIG. 1 is a block diagram illustrating a configuration of a touch panel system according to a first embodiment.

Hereinafter, embodiments of the present disclosure will be described in detail with reference to the drawings. In the drawings, identical or corresponding parts are denoted by the same reference signs, and the description thereof will not be repeated. Note that, for ease of description, in the drawings referred to below, the configuration may be simplified or schematically illustrated, or some of the components may be omitted. Further, the dimensional ratios between the components illustrated in the drawings are not necessarily indicative of actual dimensional ratios. Further, in the drawings referred to below, various electrodes are displayed with hatching in order to facilitate the identification of various electrodes.

First Embodiment

FIG. 1 describes a configuration of a touch panel system 100 according to a first embodiment. FIG. 1 is a block diagram illustrating the configuration of the touch panel system 100 according to the first embodiment.

As illustrated in FIG. 1, the touch panel system 100 includes a touch panel 1 and a controller 2. The touch panel 1 is configured as an electrostatic capacitance type touch panel, and is configured to output a position signal value G1 indicating a position of a pointer and a pressing force signal value G2 indicating a pressing force generated by the pointer. The controller 2 provides a drive signal to the touch panel 1, acquires the position signal value G1 and the pressing force signal value G2 from the touch panel 1, and detects the position of the pointer and the pressing force generated by the pointer based on the position signal value G1 and the pressing force signal value G2. The controller 2 transmits the detection result of the position of the pointer and the pressing force generated by the pointer as output data to a control unit of a display device 101 (see FIG. 2) provided with the touch panel system 100. The output data is used for, for example, controlling an image displayed by the display device 101.

Figure 2:
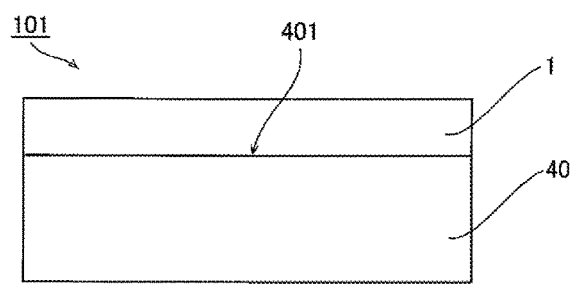
FIG. 2 is a cross-sectional view illustrating a configuration of a display device including the touch panel system according to the first embodiment.

FIG. 2 is a cross-sectional view illustrating a configuration of the display device 101 including the touch panel system 100 according to the first embodiment. As illustrated in FIG. 2, the display device 101 includes the touch panel 1 and a display 40 configured to display an image on a display surface 401. The display 40 is configured by a liquid crystal display or an organic electro luminescence (EL) display, for example.

Configuration of Touch Panel

Figure 3:
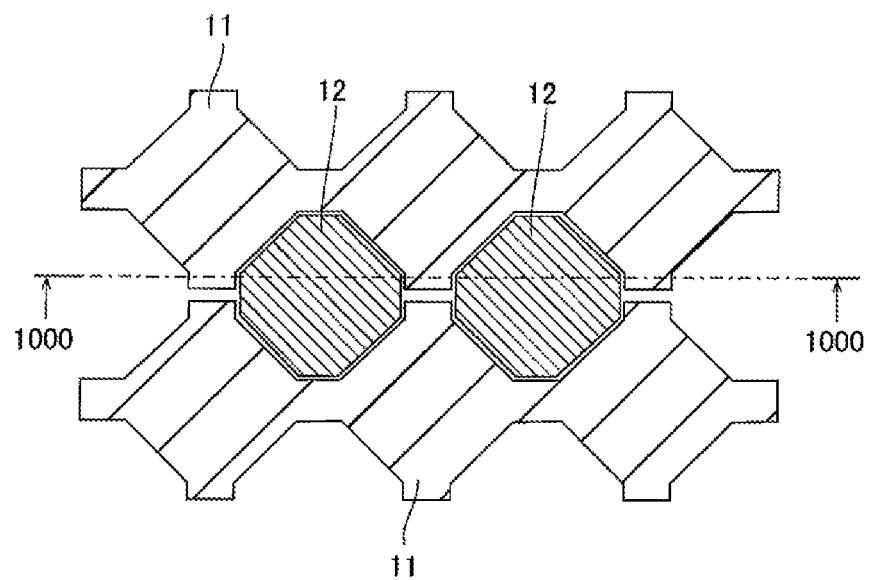
FIG. 3 is a plan view illustrating a configuration of a drive electrode included in a touch panel.
Figure 4:
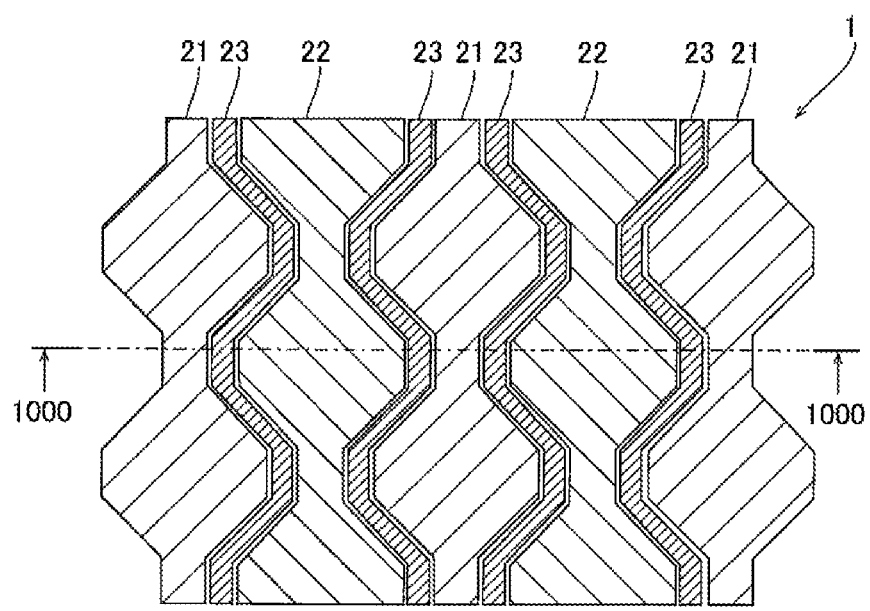
FIG. 4 is a plan view illustrating configurations of a position detection electrode and a pressing force detection electrode included in the touch panel.
Figure 5:
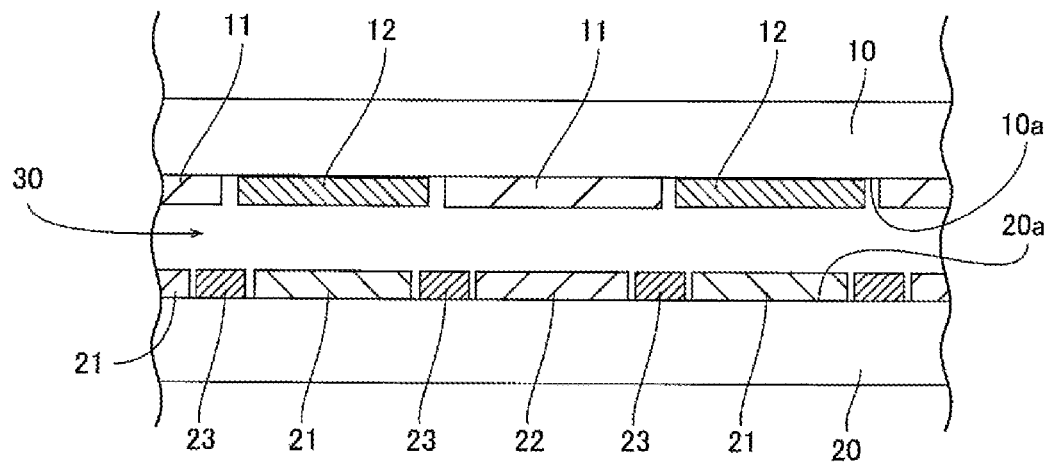
FIG. 5 is a cross-sectional view taken along the line 1000-1000 in FIGS. 3 and 4.

FIGS. 3 and 4 are plan views illustrating configurations of electrodes included in the touch panel 1 according to the first embodiment. FIG. 5 is a cross-sectional view taken along the line 1000-1000 in FIGS. 3 and 4. Note that for the sake of convenience in illustration, the electrodes included in the touch panel 1 are illustrated separately in FIGS. 3 and 4; however, as illustrated in FIG. 5, the electrodes illustrated in FIGS. 3 and 4 are layered.

As illustrated in FIG. 5, the touch panel 1 includes a first substrate 10, a drive electrode 11, a floating island electrode 12, a second substrate 20, a position detection electrode 21, a pressing force detection electrode 22, a shield electrode 23, and a dielectric layer 30 (pressure-sensitive material). For example, the first substrate 10 and the second substrate 20 are each made of a transparent material such as a glass film or a poly ethylene terephthalate (PET) film. The drive electrode 11, the floating island electrode 12, the position detection electrode 21, the pressing force detection electrode 22, and the shield electrode 23 are each made of an electrically-conductive transparent material such as indium tin oxide (ITO). The dielectric layer 30 is formed of a transparent material having elasticity such as a polymer material, an optical clear adhesive (OCA), or an optical clear resin (OCR).

The first substrate 10 and the second substrate 20 are disposed such that a first surface 10a of the first substrate 10 and a second surface 20a of the second substrate 20 face each other. The drive electrode 11 is an electrode to which a drive signal is provided and is formed on the first surface 10a. The floating island electrode 12 is in a floating state and is formed on the first surface 10a.

The position detection electrode 21 is an electrode for detecting the position of the pointer and is formed on the second surface 20a. The pressing force detection electrode 22 is an electrode for detecting the magnitude of the pressing force generated by the pointer and is formed on the second surface 20a. The shield electrode 23 is provided with a potential equal to the ground potential or a potential provided to the position detection electrode 21 or the pressing force detection electrode 22, or is in a floating state, and is formed on the second surface 20a.

As illustrated in FIG. 3, the drive electrode 11 has a shape (a diamond pattern) in which a plurality of rhombus-shaped electrodes are connected to each other in a diagonal direction of the electrodes. The floating island electrodes 12 are configured by a plurality of rhombus-shaped electrodes, which are not connected to each other.

As illustrated in FIG. 4, similar to the drive electrode 11, the position detection electrode 21 has the diamond pattern in which a plurality of rhombus-shaped electrodes are connected to each other. The pressing force detection electrode 22 also has a diamond pattern in which a plurality of rhombus-shaped electrodes are connected to each other. A connection direction in which the rhombus-shaped electrodes of the position detection electrode 21 are connected and a connection direction in which the rhombus-shaped electrodes of the pressing force detection electrode 22 are connected are parallel to each other, and the position detection electrode 21 and the pressing force detection electrode 22 are alternatively disposed with respect to a direction perpendicular to the connection directions. The connection direction of the diamond-shaped electrodes in each of the position detection electrode 21 and the pressing force detection electrode 22 is perpendicular to the connection direction of the diamond-shaped electrodes in the drive electrode 11.

As illustrated in FIGS. 4 and 5, the shield electrode 23 is disposed between the position detection electrode 21 and the pressing force detection electrode 22. For example, the shield electrode 23 is disposed between the position detection electrode 21 and the pressing force detection electrode 22 to separate them from each other.

In a plan view when viewing the second substrate 20 from the first substrate 10 (hereinafter, simply referred to as a "plan view"), the drive electrode 11 covers at least a portion of the pressing force detection electrode 22. Note that in the touch panel 1 exemplified in FIGS. 3 to 5, in a plan view, one rhombus-shaped electrode constituting the drive electrode 11 contains one rhombus-shaped electrode constituting the pressing force detection electrode 22. Similarly, in the plan view, one rhombus-shaped electrode constituting the floating island electrode 12 contains one rhombus-shaped electrode constituting the position detection electrode 21.

Operation of Touch Panel

Figure 6:
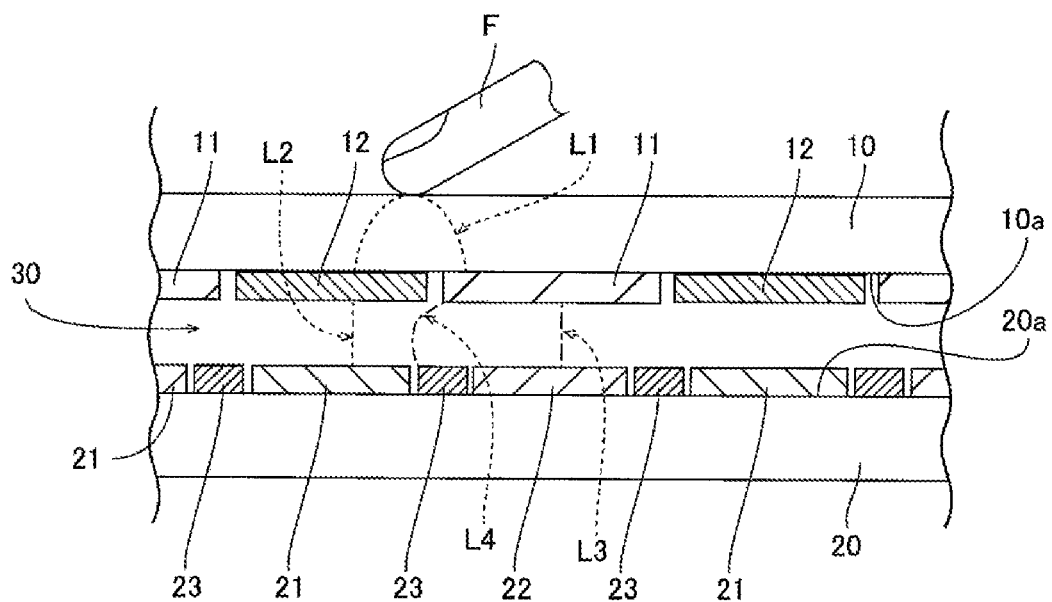
FIG. 6 is a diagram for describing operation of the touch panel.

Next, operation of the touch panel 1 will be described with reference to FIG. 6. In FIG. 6, electrical lines of force corresponding to capacitive coupling occurring between a pointer F and the various electrodes and capacitive coupling occurring between the various electrodes are indicated by dashed lines L1 and L2 and a dashed-dotted line L3. As illustrated in FIG. 6, when the pointer F comes into contact with a surface, of the first substrate 10, opposite to the first surface 10a, as indicated by the dashed line L1, the drive electrode 11 and the floating island electrode 12 are capacitively coupled with each other. At this time, as indicated by the dashed line L2, since the floating island electrode 12 and the position detection electrode 21 are capacitively coupled with each other, the drive electrode 11 and the position detection electrode 21 are capacitively coupled with each other via the floating island electrode 12. As a result, the electrostatic capacitance between the drive electrode 11 and the position detection electrode 21 decreases via the pointer F, and this results in a change in the position signal value G1 detected at the position detection electrode 21. The controller 2 detects the position of the pointer F based on the change in the position signal value G1.

As indicated by the dashed-dotted line L3 in FIG. 6, the drive electrode 11 and the pressing force detection electrode 22 are capacitively coupled with each other. Here, when the first substrate 10 is pressed by the pointer F, since the dielectric layer 30 is a material having elasticity, the distance between the drive electrode 11 and the pressing force detection electrode 22 is reduced at a portion where the pressing force is applied. As a result, the electrostatic capacitance between both the drive electrode 11 and the pressing force detection electrode 22 increases, and this results in a change in the pressing force signal value G2 detected at the pressing force detection electrode 22. The controller 2 detects the pressing force of the pointer F based on the change in the pressing force signal value G2.

When the first substrate 10 is pressed by the pointer F, the distance between the drive electrode 11 and the position detection electrode 21 is also reduced. However, since the drive electrode 11 is closer to the shield electrode 23 than to the position detection electrode 21, the drive electrode 11 is likely to be capacitively coupled with the shield electrode 23 as indicated by the dashed-dotted line L4 in FIG. 6. Thus, the electrostatic capacitance between the drive electrode 11 and the position detection electrode 21 is less likely to increase, and the decrease in electrostatic capacitance between the drive electrode 11 and the position detection electrode 21 due to the pointer F is less likely to be canceled out.

In addition, since the pointer F is closer to the shield electrode 23 than to the pressing force detection electrode 22 on a path from the pointer F to the pressing force detection electrode 22, the pointer F is likely to be capacitively coupled with the shield electrode 23. Thus, the pointer F is inhibited from being capacitively coupled with each of the drive electrode 11 and the pressing force detection electrode 22, and this inhibits the electrostatic capacitance between both the electrodes from fluctuating.

Configuration of Controller

Figure 7:
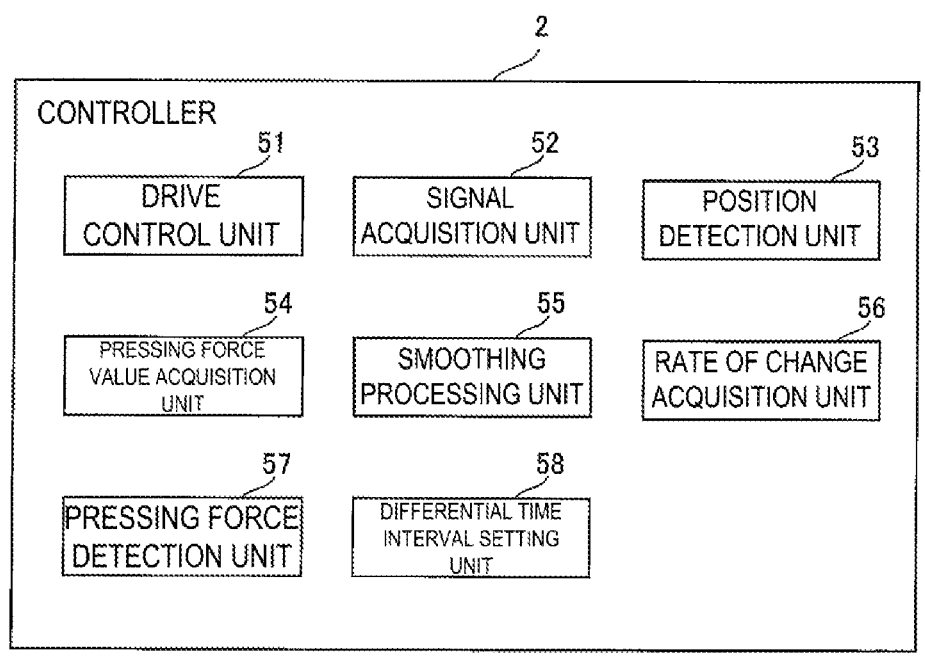
FIG. 7 is a functional block diagram of a controller of the first embodiment.

Next, a configuration of the controller 2 will be described with reference to FIG. 7 to FIG. 16B. FIG. 7 is a functional block diagram of the controller 2. The controller 2 includes a processor (control circuit) that performs control processing of the touch panel system 100 by executing a program. As illustrated in FIG. 7, the controller 2 functions as a drive control unit 51, a signal acquisition unit 52, a position detection unit 53, a pressing force value acquisition unit 54, a smoothing processing unit 55, a rate of change acquisition unit 56, a pressing force detection unit 57, and a differential time interval setting unit 58.

Configuration of Drive Control Unit

The drive control unit 51 transmits a drive signal to the touch panel 1, for each unit time (one frame period). For example, the drive control unit 51 sequentially transmits the drive signal to the drive electrodes 11 of the touch panel 1. "One frame period" means a period during which the drive signal is transmitted to all of the drive electrodes 11 of the touch panel 1 (a period of one cycle).

Configuration of Signal Acquisition Unit

Figure 8:
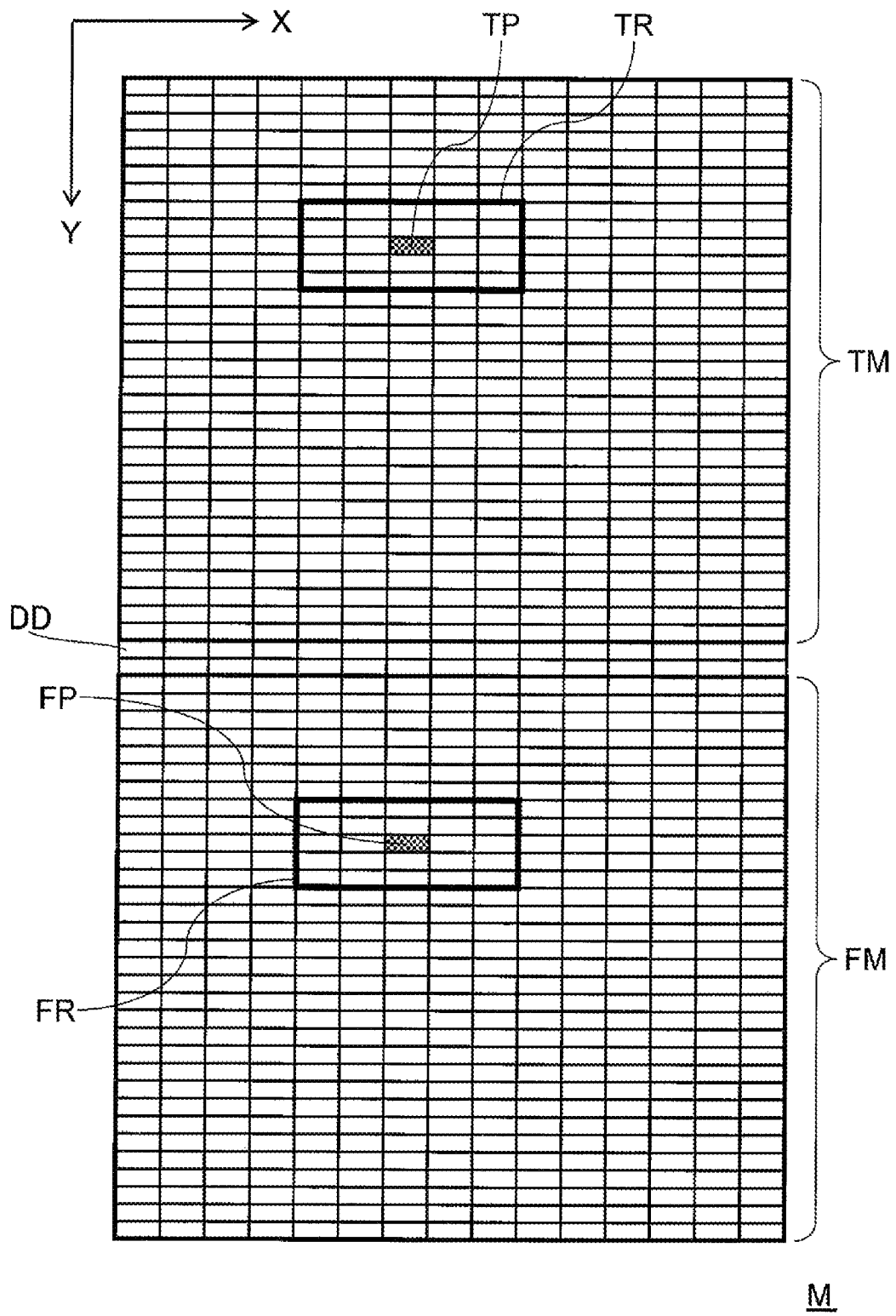
FIG. 8 is a schematic view illustrating a configuration example of input data processed by the controller.

The signal acquisition unit 52 generates a data map M using the acquired position signal value G1 and pressing force signal value G2. The data map M will now be described with reference to FIG. 8. The data map M illustrated in FIG. 8 is data acquired when 15 drive electrodes 11, 32 position detection electrodes 21, and 32 pressing force detection electrodes 22 are provided. The data map M is data having elements represented in a two-dimensional coordinate of (X, Y). The X direction is a direction in which the drive electrodes 11 are aligned, and the Y direction is a direction in which the position detection electrodes 21 and the pressing force detection electrodes 22 are aligned. Note that in the following, a direction in which the value of Y increases is referred to as down, and a direction in which the value of Y decreases is referred to as up.

The data map M is data in which the position signal values G1 and the pressing force signal values G2 are arranged in different regions of one two-dimensional coordinate system and combined. In the data map M illustrated in FIG. 8, a position detection map TM in which the position signal values G1 acquired from the position detection electrodes 21 are aligned and a pressing force detection map FM in which the pressing force signal values G2 acquired from the pressing force detection electrodes 22 are aligned are each arranged in different regions such that the position detection map TM is on the upper side and the pressing force detection map FM is on the lower side, with two rows of dummies DD interposed between the maps TM and FM at a central portion in the Y direction. As illustrated in FIG. 4, the position detection electrodes 21 and the pressing force detection electrodes 22 are alternately aligned, and are arranged such that the position signal values G1 and the pressing force signal values G2 are separated. In the data map M illustrated in FIG. 8, the position signal value G1 corresponding to an electrostatic capacitance formed by the X-th drive electrode 11 and the Y-th position detection electrode 21, with one corner on the touch panel 1 serving as the origin, is an element of (X, Y). On the other hand, the pressing force signal value G2 corresponding to an electrostatic capacitance formed by the X-th drive electrode 11 and the Y-th pressing force detection electrode 22 is an element of (X, Y+34).

Hereinafter, description will be given with reference to a case where, in the data map M, when the surface of the touch panel 1 is pressed by the pointer F, the position signal value G1 of an element corresponding to the vicinity of the center of a contact portion of the pointer F in the position detection map TM increases to a positive value, and the pressing force signal value G2 of the element corresponding to the vicinity of the center of the contact portion of the pointer F in the pressing force detection map TM also increases to a positive value.

Configuration of Position Detection Unit

As illustrated in FIG. 8, the position detection unit 53 detects a position TP of the pointer F from within the position detection map TM of the data map M. Here, in the first embodiment, when the position signal value G1 becomes equal to or greater than a position detection threshold value G1t continuously for a plurality of frame periods (for example, three frame periods), the position detection unit 53 detects, as the position TP of the pointer F, among the elements in the position detection map TM, an element that is equal to or greater than the position detection threshold value G1t of the fourth frame and is the maximum in the elements of the position detection map TM. According to this configuration, since detection is performed when the position signal value G1 is equal to or greater than the position detection threshold value G1t continuously for a plurality of times, it is possible to prevent the position of the pointer F from being erroneously detected when the position signal value G1 becomes equal to or greater than the position detection threshold value G1t only once due to noise. Note that in a case where there is no element in which the position signal value G1 is equal to or greater than the position detection threshold value G1t in the position detection map TM, the position detection unit 53 determines that there is no pointer F that is in contact with the touch panel 1.

The position detection unit 53 calculates the detailed position of the pointer F. A method for calculating the detailed position by the position detection unit 53 will be described with reference to FIG. 9 and FIG. 10. FIG. 9 and FIG. 10 are schematic views illustrating a method for calculating the detailed position of the pointer F by the controller 2. Note that in FIG. 9 and FIG. 10, the position TP of the pointer F is set to (0, 0).

As illustrated in FIG. 8 and FIG. 9, the position detection unit 53 sets a position detection range TR having a size A×B so as to include the position TP of the pointer F. FIG. 8 and FIG. 9 illustrate a case where a region of 5×5 is set as the position detection range TR, with the position TP of the pointer F serving as the center. Note that in a case where a portion of the position detection range TR exceeds the boundary of the position detection map TM when a 5×5 position detection range TR is set with the position TP of the pointer F serving as the center, the position detection range TR may be set to be smaller than 5×5 by removing the excess portion, or the position detection range TR may be set so as to fall within the position detection map TM while having the size of 5×5 by shifting the position TP of the pointer F from the center.

The position detection unit 53 calculates a signal value C(X, Y) by cumulatively adding a signal value D(X, Y) in the position detection range TR in the Y direction. Specifically, the position detection unit 53 calculates the signal value C(X, Y) by C(X, Y)=C(X, Y−1)+D(X, Y). However, in the calculation of the signal value C(X, Y), the position detection unit 53 sets C(X, Y)=D(X, Y) for an element at the upper end of the position detection range TR for which C(X, Y−1) cannot be calculated.

The position detection unit 53 calculates the position of the center of gravity of the calculated signal value C(X, Y) based on the magnitude of the signal value and the coordinate (X, Y), and sets the position of the center of gravity as the detailed position of the pointer F. When the detailed position of the pointer F is calculated in this manner, the position of the pointer F present between the coordinates (X, Y) can be detected, and thus the resolution of detecting the position of the pointer F can be improved.

Configuration of Pressing Force Value Acquisition Unit

The pressing force value acquisition unit 54 acquires a provisional value based on the pressing force signal value G2, and acquires a value (a pressing force value Z) which is a value of amplifying the provisional value. Specifically, as illustrated in FIG. 8, the pressing force value acquisition unit 54 sets a pressing force detection range FR in the pressing force detection map FM of the data map M. The pressing force value acquisition unit 54 sets the pressing force detection range FR having a size of C×D so as to include the position TP of the pointer F. FIG. 8 illustrates a case where a region of 5×5 is set as the pressing force detection range FR, with a position FP in the pressing force detection map FM corresponding to the position TP of the pointer F serving as the center. In the example illustrated in FIG. 8, an X coordinate of the position FP is the same as that of the position TP, and a Y coordinate of the position FP is a value acquired by adding 34 to the Y coordinate of the position TP. Note that in a case where a portion of the pressing force detection range FR exceeds the boundary of the pressing force detection map FM when a 5×5 pressing force detection range FR is set with the position FP serving as the center, the pressing force detection range FR may be set to be smaller than 5×5 by removing the excess portion, or the pressing force detection range FR may be set so as to fall within the pressing force detection map FM while having the size of 5×5 without setting the position FP as the center.

The pressing force value acquisition unit 54 calculates a provisional value of the magnitude of the pressing force generated by the pointer F based on the pressing force signal value G2 within the pressing force detection range FR. For example, the pressing force value acquisition unit 54 calculates the provisional value by summing the absolute values of the pressing force signal values G2 within the pressing force detection range FR. Note that the method for calculating the provisional value including the method for setting the pressing force detection range FR is preferably such that, for example, when the pointer F, which has a constant contact area, is pressed against the touch panel 1 while changing the pressing force, the provisional value is preferably a value proportional to the pressing force.

Then, the pressing force value acquisition unit 54 calculates the pressing force value Z, which is a value acquired by amplifying the provisional value. The pressing force value acquisition unit 54 may calculate the pressing force value Z by multiplying the provisional value by the amplification ratio and then adding or subtracting the offset value.

Configuration of Smoothing Processing Unit

Figure 11:
FIG. 11 is a graph showing an example of pressing force values for individual frames.

The smoothing processing unit 55 acquires a smoothed value Zs by smoothing the pressing force value Z calculated by the pressing force value acquisition unit 54. FIG. 11 shows an example of pressing force values Z acquired in a plurality of frame periods (for example, 21 frames). Here, unlike the position detection unit 53 that detects the position of the pointer from the fourth frame, the smoothing processing unit 55 performs processing of smoothing from a point in time (first frame) when the position signal value G1 becomes equal to or greater than the position detection threshold value G1$t$.

Figure 12:
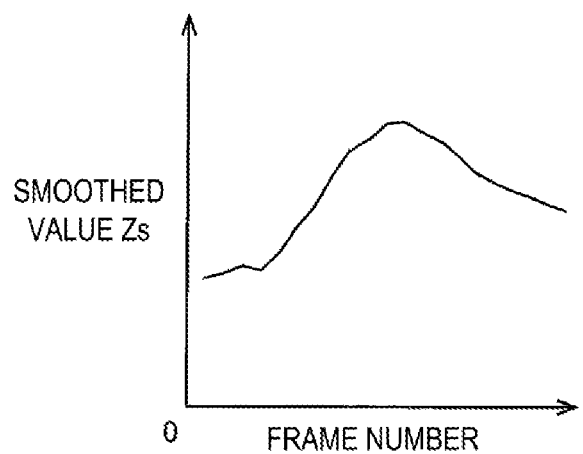
FIG. 12 is a graph showing an example of smoothed values for individual frames.

FIG. 12 is an example of smoothed values Zs acquired by smoothing the pressing force values Z in FIG. 11. The smoothing processing unit 55 acquires the smoothed value Zs represented by Equation (1), where a point in time when the position signal value G1 becomes equal to or greater than the position detection threshold value G1$t$ is a first frame (first point in time), a pressing force value Z of the pressing force signal value G2 acquired after N frames (where N is a natural number) from the first frame is Z1, and a pressing force value Z of the pressing force signal value G2 acquired before one frame from the N-th point in time is Z2. According to this Equation (1), as a point in time becomes closer to the first point in time (first frame) (N becomes smaller), the smoothing is performed more strongly, and thus influence of noise can be reduced even immediately after the first point in time.

$$Zs = \{(N-1)/N\} \times Z2 + (1/N) \times Z1 \quad (1)$$

Figure 13:
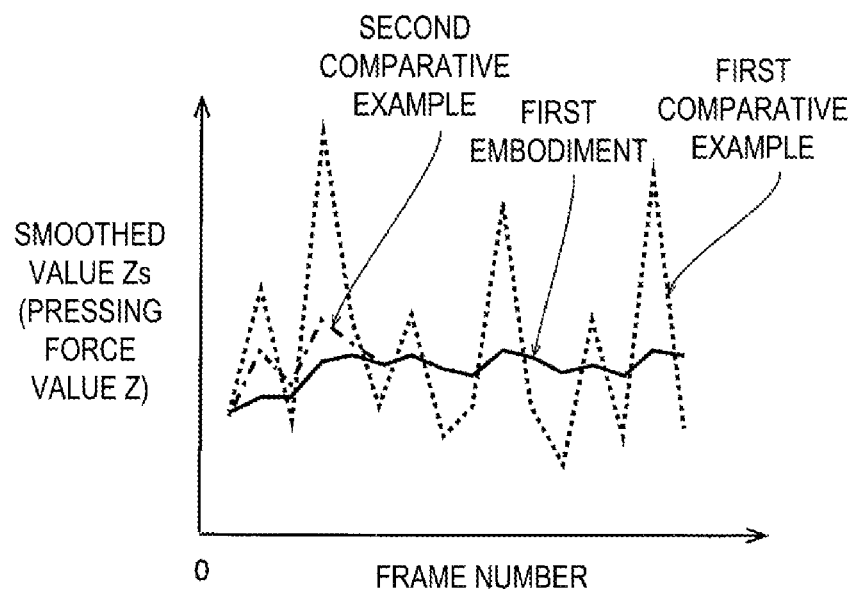
FIG. 13 is a graph for describing an effect of a smoothing processing unit.

FIG. 13 is a graph showing results of comparison with comparative examples for describing an effect of the smoothing processing unit 55. A first comparative example is a diagram illustrating fluctuation in the pressing force values Z before smoothing. In a second comparative example, the first frame to the third frame are the average values of the pressing force value Z in the latest frame and the pressing force value Z before one frame. The fourth frame to the (N−1)-th frame are the average values of the pressing force value Z of the last four frames from the latest frame, and the N-th and subsequent frames are frames on which a smoothing process similar to that of the first embodiment was performed. As a result, it has been found that while the fluctuation of the value of the second comparative example is more reduced as compared with the pressing force values Z of the first comparative example before smoothing, the fluctuation of the smoothed values Zs according to the first embodiment is more significantly suppressed as compared with the second comparative example. According to the configuration of the first embodiment, it has been found that the influence of noise can be reduced even immediately after the first point in time, and erroneous detection of the pressing force of the pointer F due to noise can be prevented.

Figure 14:
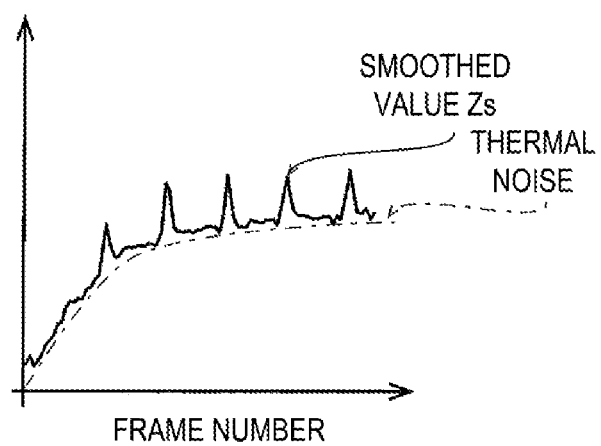
FIG. 14 is a graph for describing that a value of thermal noise is superimposed on the pressing force value.

As shown in FIG. 14, values due to thermal noise (dotted line portion in FIG. 14) are superimposed on the smoothed values Zs (pressing force values Z). In other words, the dielectric constant of the dielectric layer 30 fluctuates due to the heat of the pointer being transferred to the dielectric layer 30, and the smoothed values Zs (pressing force values Z) change due to the change in the dielectric constant.

Figure 15:
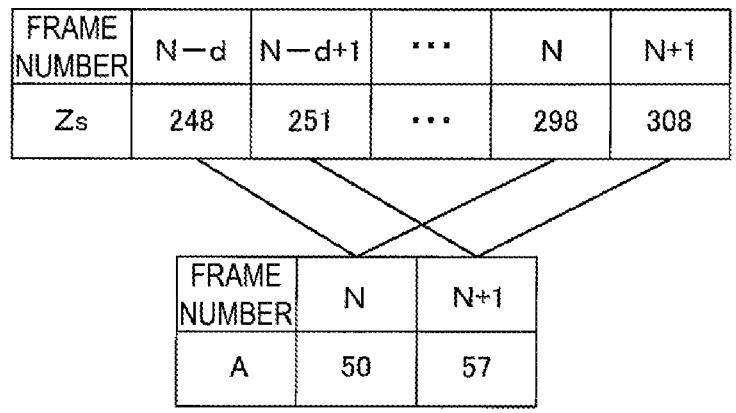
FIG. 15 is a diagram for describing an effect of acquiring the rate of change from a first frame.

Configurations of Rate of Change Acquisition Unit and Differential Time Interval Setting Unit FIG. 15 is a diagram illustrating an example of acquisition (calculation) of a rate of change A. In the first embodiment, the rate of change acquisition unit 56 acquires the rate of change A of the smoothed values Zs. Similar to the smoothing processing unit 55, the rate of change acquisition unit 56 performs processing for acquiring the rate of change A from a point in time (first frame) when the position signal value G1 becomes equal to or greater than the position detection threshold value G1t. Here, in a case where a quick operation is performed in which the pressing force value Z increases (or decreases) across a few frames, such as in the pressing force detection of the tap, even if the rate of change A is acquired in the fourth and subsequent frames, the pressing force value Z is already large (small) at the time of the fourth frame, and thus the detection accuracy of the pressing force decreases. In contrast, according to the above-described configuration, since the processing for acquiring the rate of change A is performed from the first frame, the pressing force generated by the pointer F can be detected with greater accuracy.

Specifically, as illustrated in FIG. 15, the rate of change acquisition unit 56 acquires the rate of change A by subtracting a smoothed value Zs based on a past pressing force value Z from a smoothed value Zs based on the latest pressing force value Z. Here, the "smoothed value Zs based on a past pressing force value Z" is the smoothed value Zs of the pressing force value Z calculated based on the pressing force signal value G2 acquired from the pressing force detection electrode 22 before a natural number d frames from a point in time (frame) when the latest pressing force signal value G2 is acquired. The smoothed value Zs based on the latest pressing force value Z is referred to as a smoothed value Zs(N), and the smoothed value Zs based on a past pressing force value Z is referred to as a smoothed value Zs(N−d). The rate of change acquisition unit 56 calculates the rate of change A for each frame based on Equation (2) below. Where, the rate of change A of the N-th frame is A(N).

$$A(N) = Zs(N) - Zs(N - d) \quad (2)$$

The differential time interval setting unit 58 (see FIG. 7) sets the value of the natural number d for determining the past pressing force value Z used in the calculation of the rate of change A, based on an input operation from an operator. The input operation from the operator may be an input operation on the touch panel 1 by the operator, or may be an input operation to an operation unit (not illustrated) provided separately from the touch panel 1 by the operator. As the value of the natural number d is set to be larger, the signal increases. However, since the number of smoothed values Zs to be stored increases, the load on the memory (not illustrated) of the controller 2 increases. According to this configuration, the value of the natural number d can be set as desired, and thus in a case where the absolute value (signal) of the rate of change A is set to be larger, the natural number d may be set to be larger and in a case where the load on the memory is to be reduced, the natural number d may be set to be smaller.

Figure 16A:
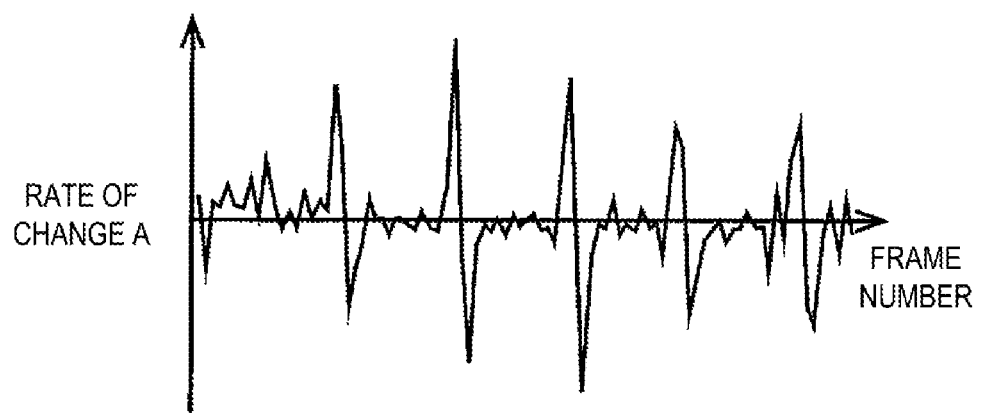
FIG. 16A is a graph showing temporal change of the rate of change.

FIG. 16A is a graph showing the rate of change A of the smoothed value Zs in FIG. 14. In FIG. 16A, unlike FIG. 14, the influence of thermal noise is reduced. In other words, since the change in the smoothed value Zs due to thermal noise is smaller than the change in the smoothed value Zs due to the pressing force of the pointer, the value due to thermal noise is less likely to be superimposed on the rate of change A. As a result, erroneous detection due to thermal noise can be prevented.

Configuration of Pressing Force Detection Unit

Figure 16B:
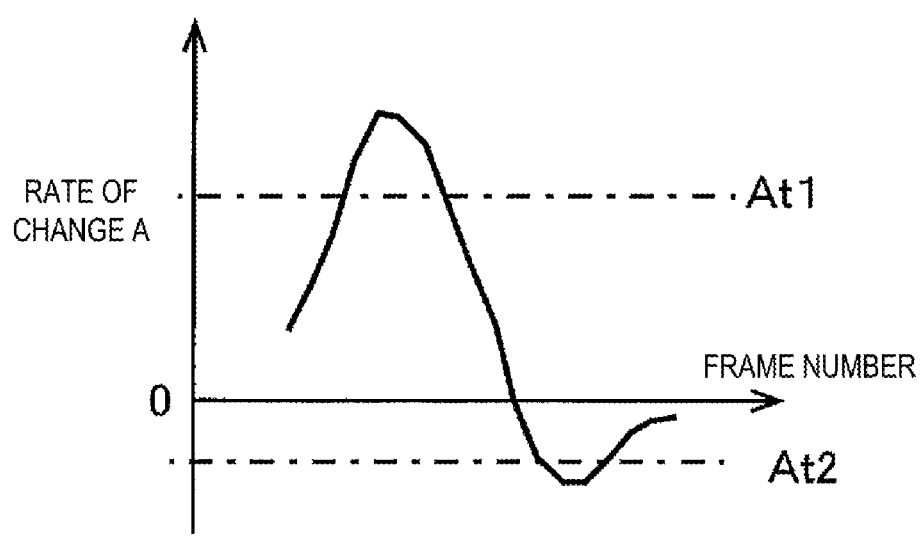
FIG. 16B is a graph for describing detection of a pressing force of the pointer and detection of release of the pressing force of the pointer.

As shown in FIG. 16B, the pressing force detection unit 57 compares the rate of change A with a pressing force detection threshold value At1 to determine that the pressing is performed by the pointer (detect the pressing force of the pointer). Specifically, when the pointer presses the touch panel 1, the rate of change A increases. When the rate of change A becomes equal to or greater than the pressing force detection threshold value At1, the pressing force detection unit 57 determines that the pressing is performed by the pointer at the position FP.

After the rate of change A becomes equal to or greater than the pressing force detection threshold value At1, the pressing force detection unit 57 determines that the pressing force generated by the pointer has been released by comparing the rate of change A with a pressing force release detection threshold value At2 (detects the release of the pressing force of the pointer). Specifically, when the pressing force of the pointer F pressing the touch panel 1 is weakened, the rate of change A decreases. When the rate of change A becomes equal to or less than the pressing force release detection threshold value At2, the pressing force detection unit 57 determines that the pressing force generated by the pointer at the position FP is released. The pressing force release detection threshold value At2 is a value smaller than the pressing force detection threshold value At1.

According to the configuration above, both of the detection of the position of the pointer F and the detection of the pressing force generated by the pointer F can be performed by the electrostatic capacitance type touch panel 1 without using a pyroelectric body. Here, the rate of change A of the pressing force value Z (smoothed value Zs) due to the influence of heat (thermal noise) from the pointer to the touch panel 1 is smaller than the rate of change of the pressing force value due to the pressing force of the pointer. Thus, according to the above-described configuration, since the pressing force of the pointer F is detected based on the rate of change A of the smoothed value Zs of the pressing force value Z, even when the temperature of the touch panel 1 changes, the influence of thermal noise is reduced, and the pressing force of the pointer F can be detected with high accuracy.

Method for Controlling Touch Panel System

Figure 17:
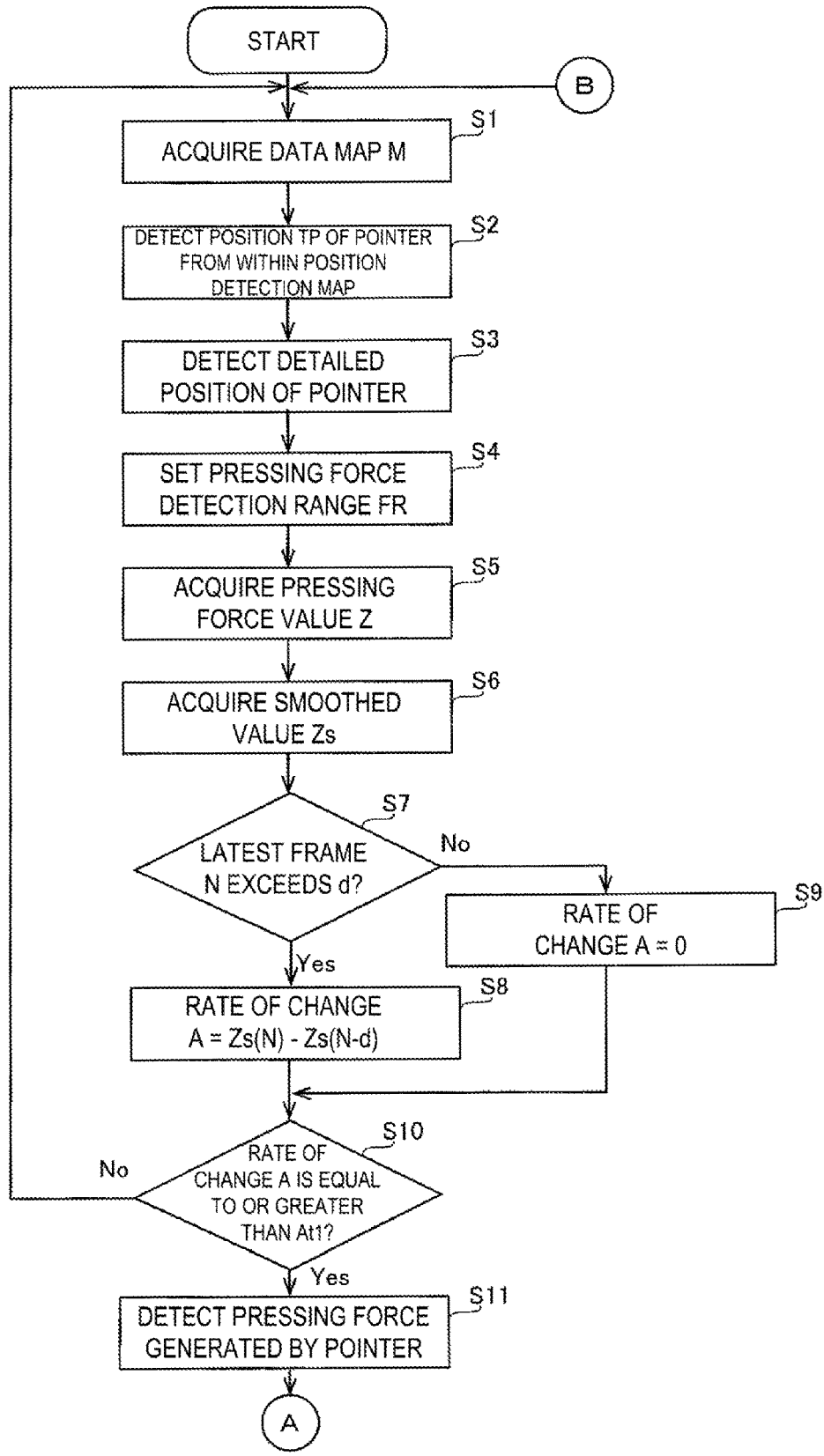
FIG. 17 is a flow diagram (1) illustrating control processing performed by a controller 2 included in the touch panel system according to the first embodiment.
Figure 18:
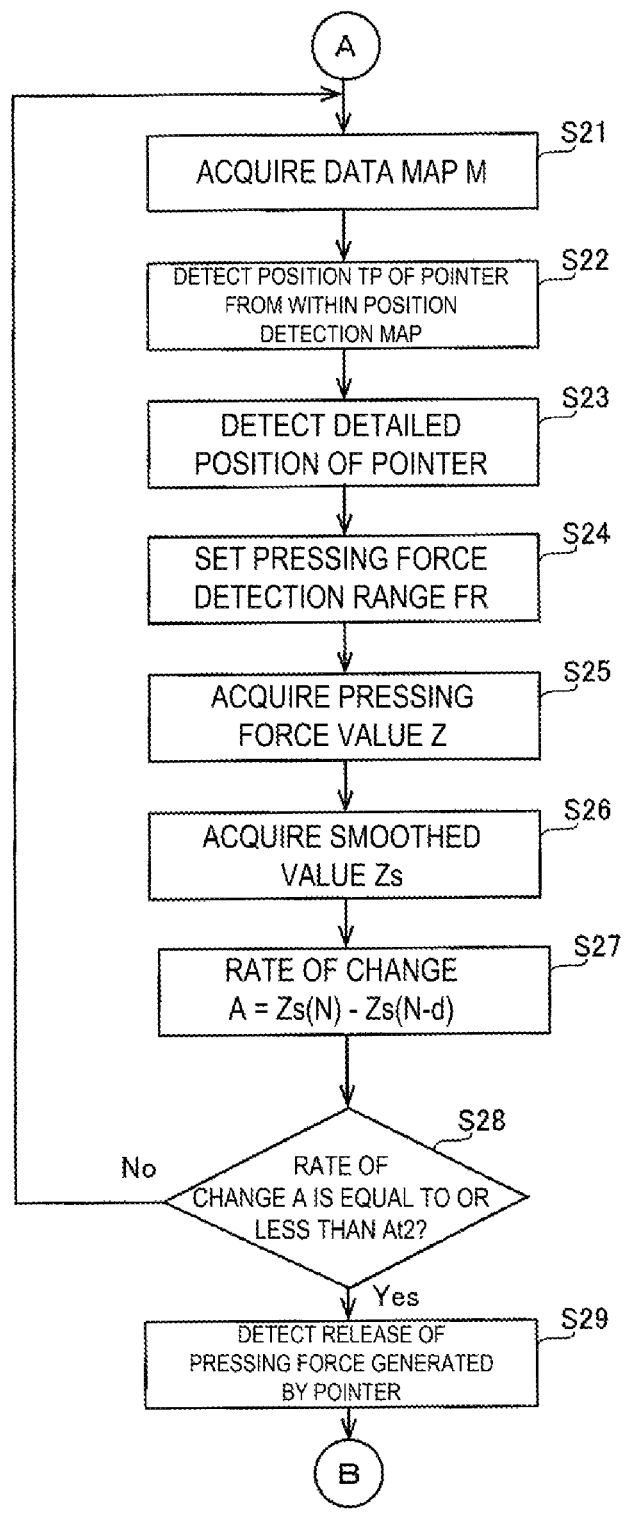
FIG. 18 is a flow diagram (2) illustrating the control processing performed by the controller 2 included in the touch panel system according to the first embodiment.

Next, a method for controlling the touch panel system 100 will be described with reference to FIGS. 17 and 18. FIGS. 17 and 18 are diagrams illustrating a flow of control processing of the touch panel system 100. The control processing of the touch panel system 100 described below is performed by the controller 2.

As illustrated in FIG. 17, in step S1, the data map M is acquired. In other words, the position signal value G1 and the pressing force signal value G2 are acquired from the touch panel 1.

In step S2, the position TP of the pointer is detected from within the position detection map TM. Subsequently, in step S3, a detailed position of the pointer is calculated, and output data including information on the detailed position of the pointer is transmitted to the display device 101.

In step S4, the pressing force detection range FR is set based on the position TP of the pointer. Subsequently, in step S5, the pressing force value Z is calculated. Subsequently, in step S6, the smoothed value Zs is acquired based on the pressing force value Z.

In step S7, it is determined whether the latest frame N has exceeded the natural number d. If the latest frame N exceeds the natural number d, then the process proceeds to step S8, and if the latest frame N does not exceed the natural number d, then the process proceeds to step S9.

In step S8, the rate of change A of the smoothed value Zs is calculated by the difference between the smoothed value Zs(N) and the smoothed value Zs(Nd). On the other hand, in step S9, the rate of change A of the smoothed value Zs is set to 0. Subsequently, the process proceeds to step S10.

In step S10, it is determined whether the rate of change A is equal to or greater than the pressing force detection threshold value At1. If the rate of change A is equal to or greater than the pressing force detection threshold value At1, then the process proceeds to step S11. If the rate of change A is less than the pressing force detection threshold value At1, then the process returns to step S1 to acquire the data map M in the next frame period.

In step S11, it is determined that pressing has been performed by the pointer at the position FP and the output data including information indicating that the pressing has been performed by the pointer at the position FP is transmitted to the display device 101. Subsequently, the process proceeds to step S21 (see FIG. 18).

As illustrated in FIG. 18, in step S21, the data map M is acquired. Subsequently, in step S22, the position TP of the pointer is detected from within the position detection map TM. Subsequently, in step S23, a detailed position of the pointer is calculated, and output data including information on the detailed position of the pointer is transmitted to the display device 101.

In step S24, the pressing force detection range FR is set based on the position TP of the pointer. Subsequently, in step S25, the pressing force value Z is calculated. Then, in step S26, the smoothed value Zs is acquired based on the pressing force value Z. Subsequently, in step S27, the rate of change A of the smoothed value Zs is calculated.

In step S28, it is determined whether the rate of change A is equal to or less than the pressing force release detection threshold value At2. If the rate of change A is equal to or less than the pressing force release detection threshold value At2, then the process proceeds to step S29. If the rate of change A is greater than the pressing force release detection threshold value At2, then the process returns to step S21 to acquire the data map M in the next frame period.

In step S29, it is determined that the pressing force generated by the pointer has been released and the output data including information indicating that the pressing force generated by the pointer has been released is transmitted to the display device 101. Subsequently, the process returns to step S1 (see FIG. 17).

As described above, both of the detection of the position of the pointer F and the detection of the pressing force generated by the pointer F can be performed by the electrostatic capacitance type touch panel 1 without using a pyroelectric body. Since the pressing force of the pointer F is detected based on the rate of change A of the smoothed value Zs of the pressing force value Z, even when the temperature of the touch panel 1 changes, the influence of thermal noise is reduced, and the pressing force of the pointer F can be detected with high accuracy.

Second Embodiment

Next, a configuration of a touch panel system 200 of a second embodiment will be described with reference to FIGS. 19 to 21. The touch panel system 200 of the second embodiment is provided with a function to correct the rate of change A based on an environmental temperature T, in addition to the configuration of the touch panel system 100 of the first embodiment. Note that, in the following description, when the same reference numerals as in the first embodiment are used, the same configurations as in the first embodiment are indicated, and reference is made to the preceding description unless otherwise described.

Configuration of Touch Panel System 200 according to Second Embodiment

Figure 19:
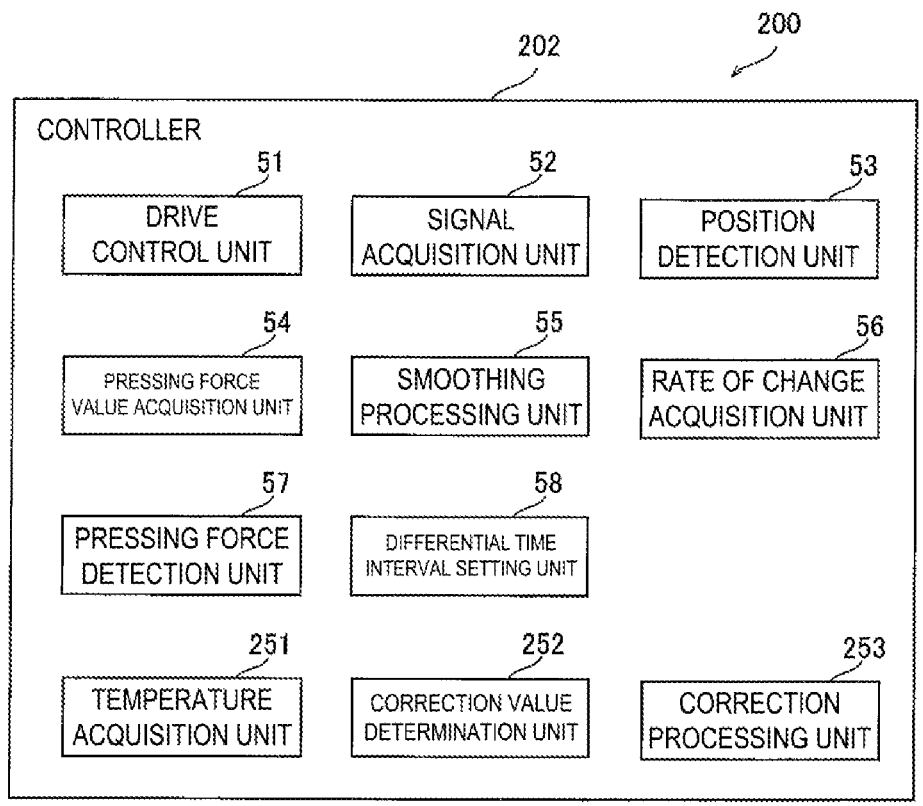
FIG. 19 is a functional block diagram of a controller of a touch panel system according to a second embodiment.

FIG. 19 is a functional block diagram of a controller 202 of the touch panel system 200. The controller 202 is provided with a temperature acquisition unit 251, a correction value determination unit 252, and a correction processing unit 253, in addition to the functions of the controller 2 according to the first embodiment.

Figure 20:
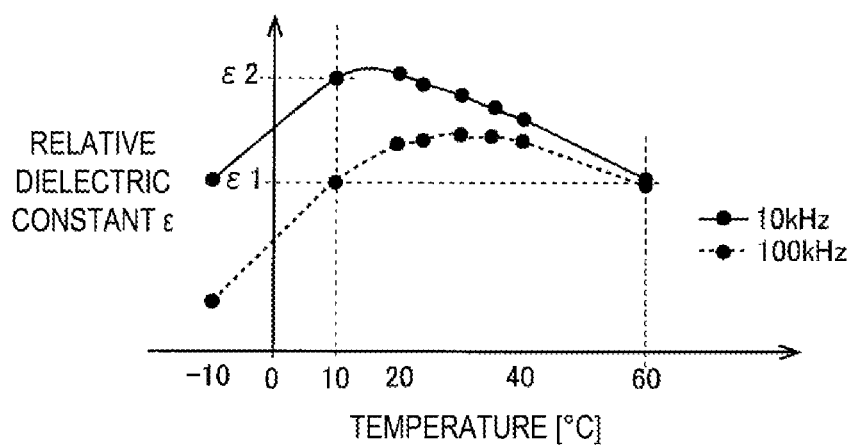
FIG. 20 is a graph for describing temperature dependency of a relative dielectric constant of a dielectric layer.

FIG. 20 is a graph for describing temperature dependency of a relative dielectric constant c of the dielectric layer 30. The temperature acquisition unit 251 acquires a capacitance value C of the dielectric layer 30 (see FIG. 5) and acquires the environmental temperature T for correction based on the capacitance value C of the dielectric layer 30. According to this configuration, the environmental temperature T for correction can be acquired without newly providing a temperature detector (temperature sensor). As shown in FIG. 20, since the relative dielectric constant c of the dielectric layer 30 is temperature dependent, the relative dielectric constant E changes in accordance with a change in temperature and the capacitance value C changes. Here, as shown in FIG. 20, there are temperatures in the high temperature region and the low temperature region in which the relative dielectric constants E are the same, but characteristics differ depending on the frequency of the voltage applied to the dielectric layer 30. Thus, the temperature acquisition unit 251 of the second embodiment acquires the environmental temperature T by measuring the capacitance value C by changing the frequency of the voltage applied to the dielectric layer 30. For example, when the environmental temperature T is 60° C., the relative dielectric constant c with a frequency of 100 kHz and a frequency of 10 kHz is $\varepsilon 1$, but when the environmental temperature T is 10° C., the relative dielectric constant c with a frequency of 100 kHz is $\varepsilon 1$, and the relative dielectric constant E with a frequency of 10 kHz is $\varepsilon 2$, which is greater than $\varepsilon 1$. The temperature acquisition unit 251 acquires the environmental temperature T as 60° C. when acquiring a result (capacitance value C) where the relative dielectric constant E with the frequency of 100 kHz and the frequency of 10 kHz is $\varepsilon 1$, and acquires the environmental temperature T as 10° C. when acquiring a result (capacitance value C) where the relative dielectric constants E with the frequency of 100 kHz and the frequency of 10 kHz are $\varepsilon 1$ and $\varepsilon 2$, respectively. Here, "environmental temperature T" refers to the temperature of the touch panel 1 (dielectric layer 30) before the touch panel 1 is touched by the pointer.

The correction value determination unit 252 determines a correction value a and a correction period E based on the environmental temperature T for correction. The "correction value a" is, for example, a value less than 1, and when the environmental temperature T for correction is in a high temperature region (for example, 60° C. or higher) or in a low temperature region (for example, 0° C. or lower), the correction value a is set to a smaller value and the correction period E is set to a longer period. The "correction period E" refers to a period from a point in time (first frame) when the position signal value G1 becomes equal to or greater than the position detection threshold value G1t to an E-th frame where E is a natural number. Note that an example is described in which the correction period E is determined by the correction value determination unit 252, but the correction period E may be a fixed period. Here, in a case where the touch panel 1 is at a low temperature or a high temperature, since the temperature difference between the pointer F and the touch panel 1 is large, thermal noise is likely to be added to the rate of change A for a certain period from the first frame. In contrast, according to the above-described configuration, since the rate of change A can be corrected in the correction period E, the influence of thermal noise can be reduced even when the touch panel 1 is at a low temperature or a high temperature. Furthermore, whether the touch panel 1 is at a low temperature or a high temperature can be detected based on the environmental temperature T for correction by the temperature acquisition unit 251, and the appropriate correction value a can be determined. As a result, the influence of thermal noise can be effectively reduced when the touch panel 1 is at a low temperature or a high temperature.

Figures 21, 22:
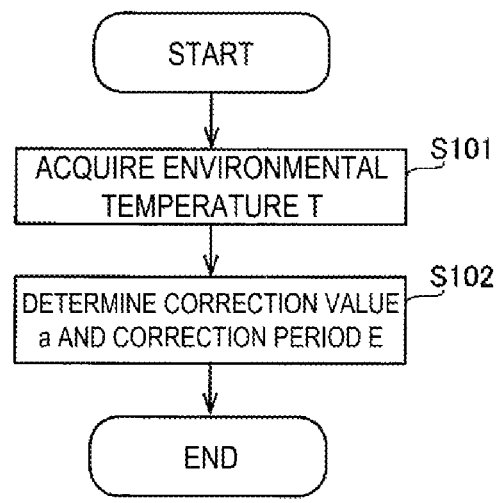
FIG. 21 is a table for describing an example of a correction process according to the second embodiment.
FIG. 22 is a flow diagram illustrating control processing for acquiring an environmental temperature and determining a correction value by a controller included in a touch panel system according to the second embodiment.

As shown in FIG. 21, the correction processing unit 253 performs a process of multiplying the rate of change A by the correction value a in the correction period E. Note that, the correction processing unit 253 does not perform the process of multiplying the rate of change A by the correction value a in and after the correction period E+1. The pressing force detection unit 57 determines the pressing force generated by the pointer based on the value of the rate of change A multiplied by the correction value a in the correction period E. In other words, the pressing force detection unit 57 compares the value of the rate of change A multiplied by the correction value a with the pressing force detection threshold value At1 in the correction period E. Other configurations are the same as the configurations in the first embodiment.

Method for Control by Second Embodiment

Figure 23:
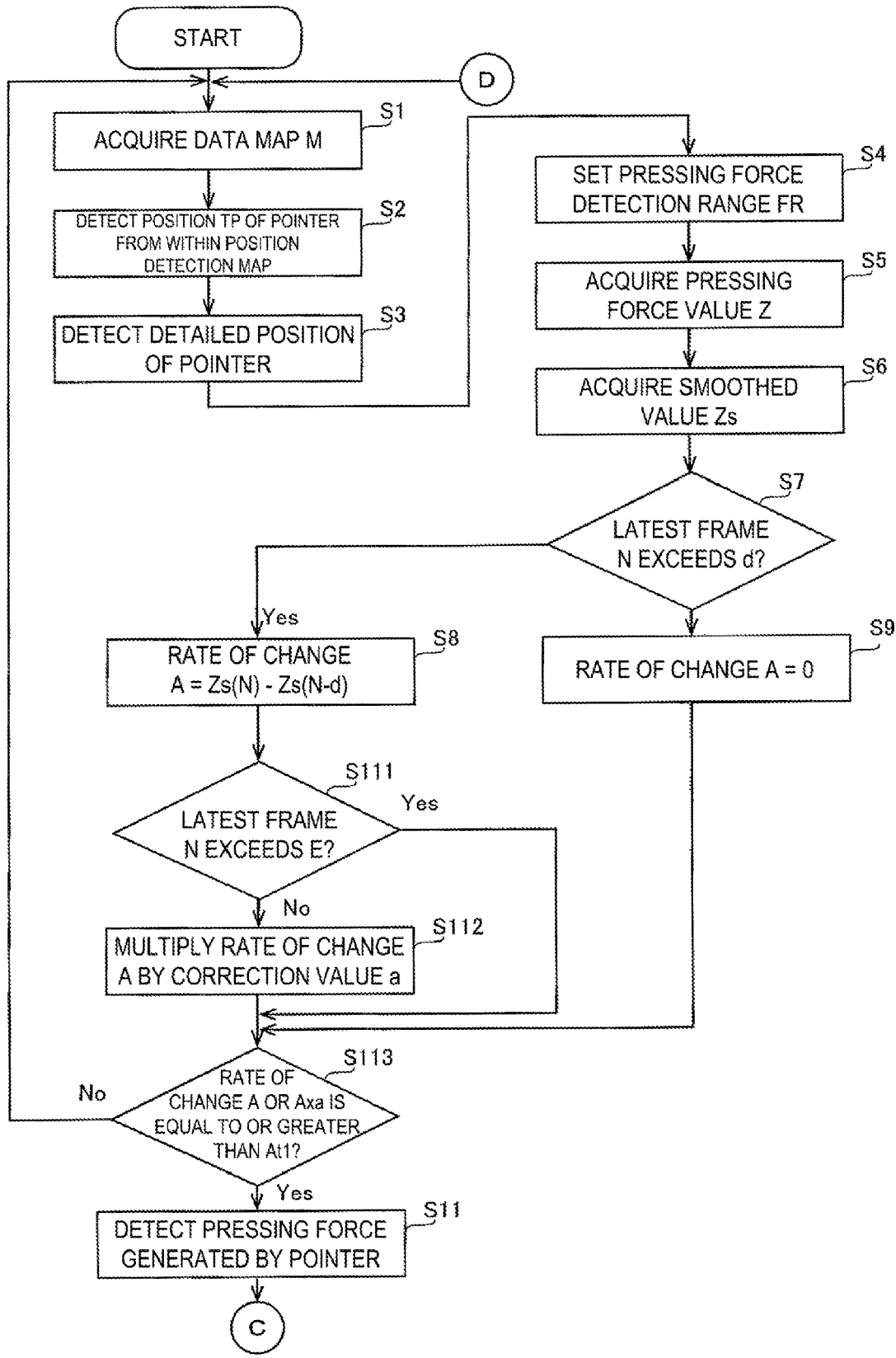
FIG. 23 is a flow diagram (1) illustrating control processing for detecting a position of a pointer and a pressing force generated by the controller included in the touch panel system according to the second embodiment.
Figure 24:
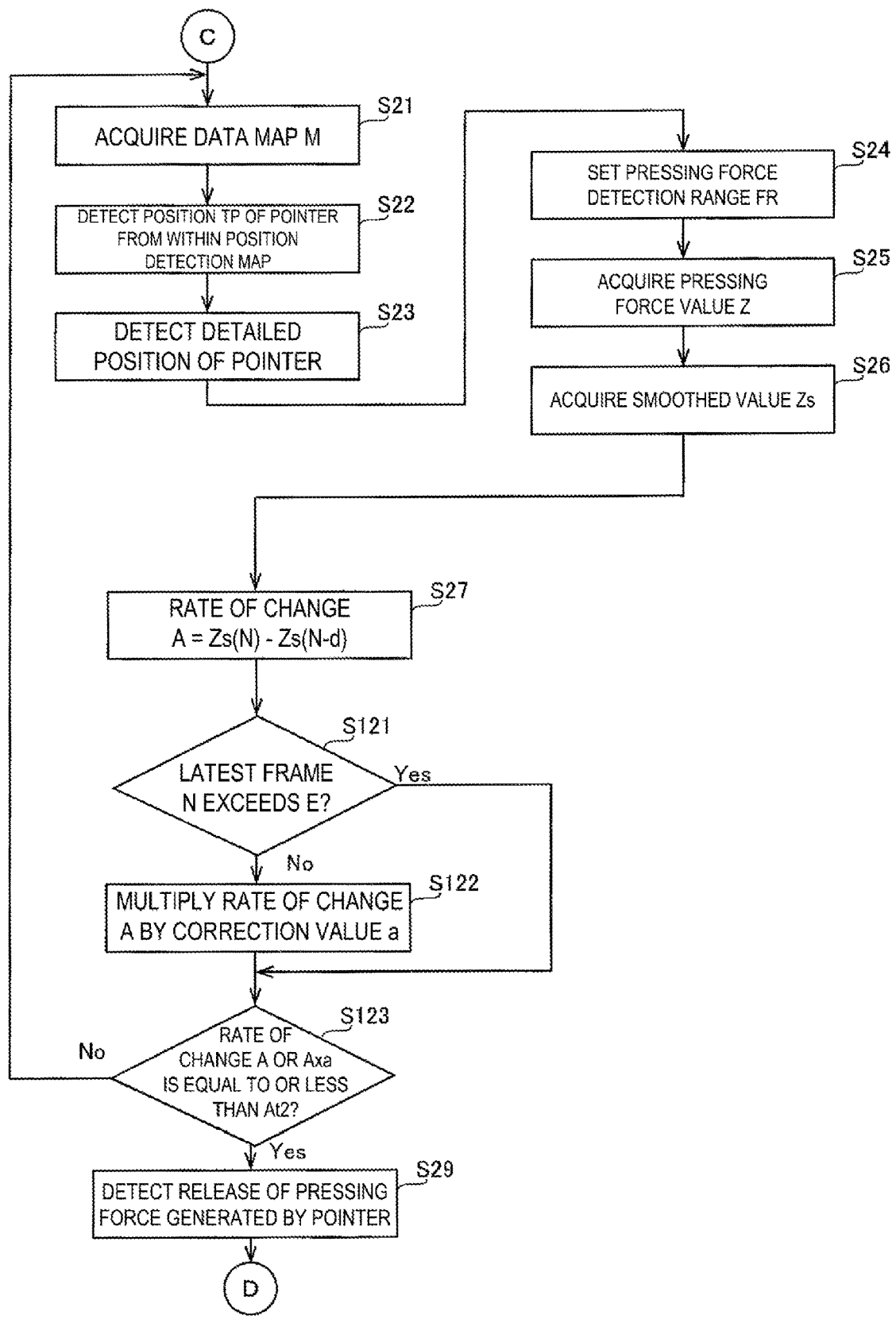
FIG. 24 is a flow diagram (2) illustrating the control processing for detecting the position of the pointer and the pressing force generated by the controller included in the touch panel system according to the second embodiment.

Next, a method for controlling the touch panel system 200 will be described with reference to FIGS. 22 to 24. FIG. 22 is a diagram illustrating a flow of control processing related to the determination of the correction value a and the correction period E of the touch panel system 200. FIGS. 23 and 24 are diagrams illustrating the flow of control processing related to the determination of the correction value a and the correction period E of the touch panel system 200. The control processing of the touch panel system 200 described below is performed by the controller 202. Note that same step numbers as in the first embodiment indicate the same processing as in the first embodiment, and reference is made to the preceding description unless otherwise described.

Processing Related to Determination of Correction Value

As illustrated in FIG. 22, in step S101, the environmental temperature T is acquired. Specifically, the capacitance value C of the dielectric layer 30 is acquired, and the environmental temperature T for correction is acquired based on the capacitance value C of the dielectric layer 30. For example, by acquiring the capacitance value C a plurality of times while changing the frequency, the environmental temperature T for correction is acquired. Subsequently, in step S102, the correction value a and the correction period E are determined based on the environmental temperature T for correction.

Process for Detection of Position of Pointer and Pressing Force

As illustrated in FIG. 23, in step S111 performed after step S8, it is determined whether the latest frame N has exceeded E. In other words, after the position signal value G1 becomes equal to or greater than the position detection threshold value G1t, it is determined whether the current frame period is a period that has exceeded the E-th frame. If the latest frame N has not exceeded the E-th frame, then the process proceeds to step S112, and if the latest frame N has exceeded the E-th frame, then the process proceeds to step S113.

In step S112, a value acquired by multiplying the rate of change A by the correction value a is acquired. Then the process proceeds to step S113.

In step S113, it is determined whether the rate of change A is equal to or greater than the pressing force detection threshold value At1. In the second embodiment, in the correction period E, it is determined whether the value acquired by multiplying the rate of change A by the correction value a is equal to or greater than the pressing force detection threshold value At1.

As illustrated in FIG. 24, in step S121 that is performed after step S27, it is determined whether the latest frame N has exceeded E. If the current time is within the correction period E, then the process proceeds to step S122, and if the current time is not within the correction period E, then the process proceeds to step S123.

In step S122, a value acquired by multiplying the rate of change A by the correction value a is acquired. Then the process proceeds to step S123.

In step S123, it is determined whether the rate of change A is equal to the pressing force detection threshold value At1 or greater. In the second embodiment, in the correction period E, it is determined whether the value acquired by multiplying the rate of change A by the correction value a is equal to or greater than the pressing force detection threshold value At1. Other control processing is the same as the control processing in the first embodiment.

According to the above-described configuration, the influence of thermal noise can be reduced even when the touch panel 1 is at a low temperature or a high temperature. Furthermore, it is possible to determine an appropriate correction value a by detecting whether the touch panel 1 is at a low temperature or a high temperature based on the environmental temperature T for correction. As a result, the influence of thermal noise can be effectively reduced when the touch panel 1 is at a low temperature or a high temperature.

Modified Examples, Etc.

The above-described embodiments are merely examples for carrying out the disclosure. Accordingly, the disclosure is not limited to the embodiments described above and can be implemented by modifying the embodiments described above as appropriate without departing from the scope of the disclosure.

For example, in the above-described first and second embodiments, examples have been illustrated in which the rate of change A of the smoothed value Zs acquired by smoothing the pressing force value Z is calculated, but the disclosure is not limited thereto. In other words, the pressing force generated by the pointer may be detected based on the rate of change of the pressing force value Z acquired by calculating the rate of change of the pressing force value Z without smoothing the pressing force value Z.

Figure 25:
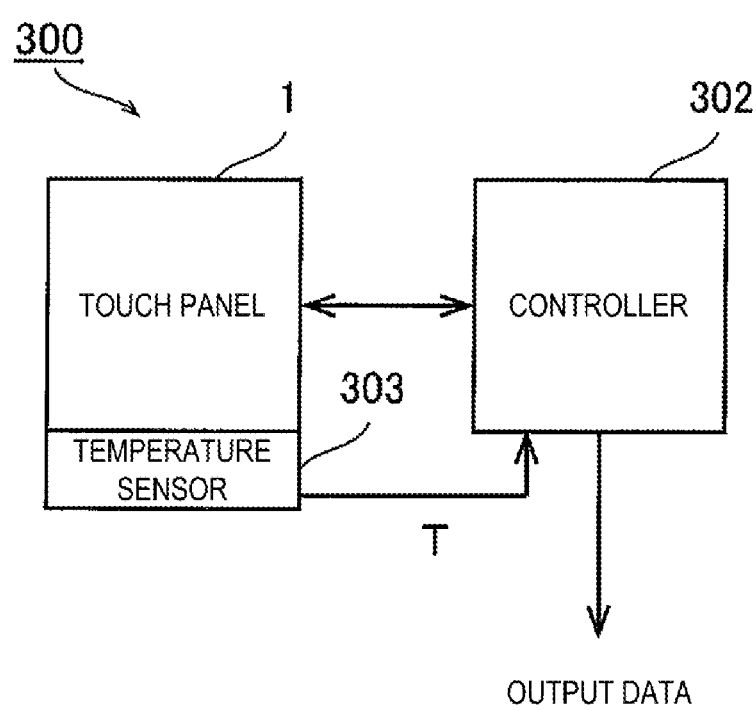
FIG. 25 is a block diagram illustrating a configuration of a touch panel system according to a first modified example of the first and second embodiments.
Figure 26:
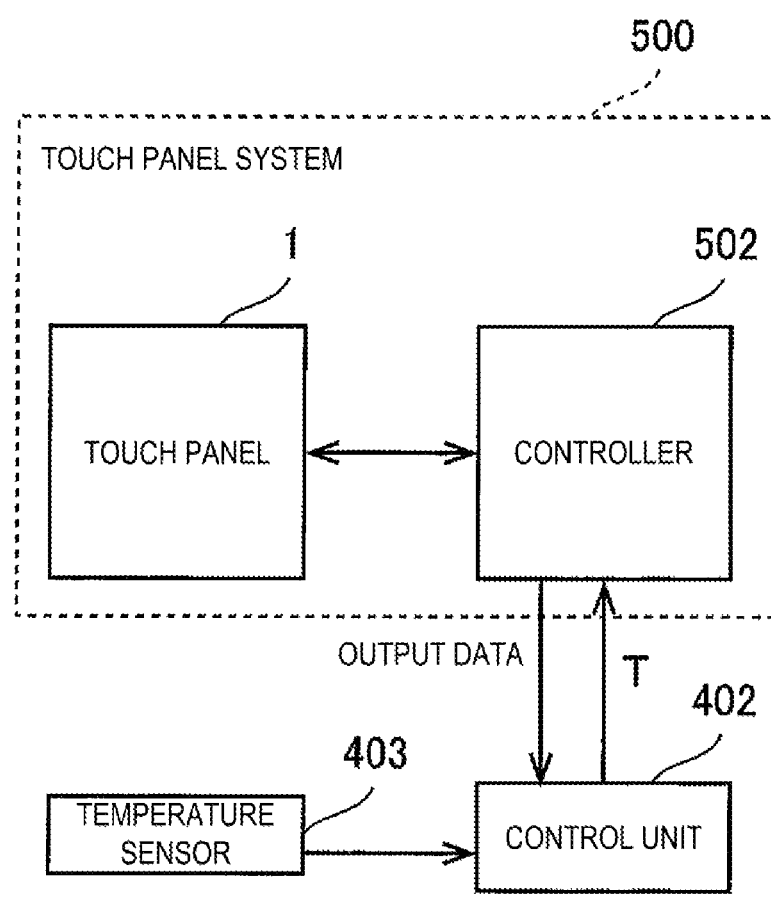
FIG. 26 is a block diagram illustrating a configuration of a touch panel system according to a second modified example of the first and second embodiments.

In the above-described second embodiment, an example has been illustrated in which the environmental temperature T is acquired based on the capacitance value C of the dielectric layer 30, but the disclosure is not limited thereto. For example, as in a touch panel system 300 of a first modified example illustrated in FIG. 25, a temperature sensor 303 that measures the temperature (environmental temperature T) of the touch panel 1 may be provided. In this case, a controller 302 acquires the environmental temperature T from the temperature sensor 303, and determines the correction value a and the correction period E based on the environmental temperature T. As in a touch panel system 500 of a second modified example illustrated in FIG. 26, the environmental temperature T detected by a temperature sensor 403 provided on the display device may be acquired by a controller 502 via a control unit 402 (OS) of the display device. In this case, the controller 502 determines the correction value a and the correction period E based on the environmental temperature T acquired from the control unit 402.

In the above-described first and second embodiments, examples have been given in which the position of the pointer is detected when the position signal value G1 becomes equal to or greater than the position detection threshold value G1$t$ continuously a plurality of times, but the disclosure is not limited thereto. In other words, the position of the pointer may be detected when the position signal value G1 becomes equal to or greater than the position detection threshold value G1$t$ for the first time.

In the above-described first and second embodiments, examples have been given in which the rate of change A is acquired from a point in time (first frame) when the position signal value G1 becomes equal to or greater than the position detection threshold value G1$t$, but the disclosure is not limited thereto. In other words, the rate of change A may be acquired from a point in time after the point in time (first frame) when the position signal value G1 becomes equal to or greater than the position detection threshold value G1$t$.

In the above-described first and second embodiments, examples have been given in which the smoothed value Zs is calculated using above-described Equation (1), but the disclosure is not limited thereto. For example, a value acquired by averaging the pressing force values Z in a period from the latest frame to last several frames may be calculated as the smoothed value.

In the above-described first and second embodiments, examples have been given in which the rate of change A is compared with the pressing force detection threshold value At1 and the pressing force release detection threshold value At2, but the disclosure is not limited thereto. For example, the rate of change A may be output from the controller 2 or 202 as information (output data) indicating the magnitude of the pressing force of the pointer without comparing the rate of change A with the pressing force detection threshold value At1 and the pressing force release detection threshold value At2.

In the above-described first and second embodiments, examples have been given in which the pressing force detection range FR is set based on the position TP of the pointer F, but the disclosure is not limited thereto. For example, the pressing force detection range FR may be set based on the detailed position of the pointer.

In the above-described first and second embodiments, the floating island electrode 12 and the shield electrode 23 may not be provided. Each of the drive electrode 11, the floating island electrode 12, the position detection electrode 21, and the pressing force detection electrode 22 may be formed in a pattern other than the diamond pattern. Part or all of the position detection electrode 21, the pressing force detection electrode 22, and the shield electrode 23 may be formed of a mesh metal (thin metal wires having a mesh shape).

The touch panel system and the display device described above can be described as follows.

A touch panel system according to a first configuration includes an electrostatic capacitance type touch panel including a drive electrode, a position detection electrode, and a pressing force detection electrode, and a controller configured to provide a drive signal to the drive electrode and acquire signal values from each of the position detection electrode and the pressing force detection electrode, wherein the controller detects a position of a pointer based on a signal value acquired from the position detection electrode, and acquires a pressing force generated by the pointer based on a rate of change of a pressing force value based on a signal value acquired from the pressing force detection electrode or a rate of change of a smoothed value of the pressing force value.

According to the above-described first configuration, both of the detection of the position of the pointer and the detection of the pressing force generated by the pointer can be performed by the electrostatic capacitance type touch panel without using a pyroelectric body. Here, the rate of change of the pressing force value due to the influence of heat (thermal noise) from the pointer to the touch panel is smaller than the rate of change of the pressing force value due to the pressing force of the pointer. Thus, according to the above-described first configuration, since the pressing force of the pointer is detected based on the rate of change of the pressing force value or the rate of change of the smoothed value of the pressing force value, even when the temperature of the touch panel changes, the influence of thermal noise is reduced, and the pressing force of the pointer can be detected with high accuracy.

In the first configuration, the controller may include a signal acquisition unit configured to acquire, for each unit time, signal values from each of the position detection electrode and the pressing force detection electrode, a position detection unit configured to detect the position of the pointer when the signal value acquired from the position detection electrode becomes equal to or greater than a position detection threshold value continuously a plurality of times, and a rate of change acquisition unit configured to acquire the rate of change of the pressing force value or the rate of change of the smoothed value of the pressing force value from a point in time when the signal value acquired from the position detection electrode becomes equal to or greater than the position detection threshold value (second configuration).

According to the above-described second configuration, since the detection of the position of the pointer is performed when the position signal value becomes equal to or greater than the position detection threshold value continuously for the plurality of times, it is possible to prevent the position of the pointer from being erroneously detected when the signal value becomes equal to or greater than the position detection threshold value only once due to noise. Here, in a case where a quick operation is performed in which the pressing force value increases (or decreases) across several frames, such as in the pressing force detection of the tap, even if the rate of change is acquired after a plurality of frames, the pressing force value is already large (small) at the time of the plurality of frames, and thus the detection accuracy of the pressing force decreases. In contrast, according to the above-described second configuration, the processing for acquiring the rate of change is performed from a point in time (first frame) when the signal value acquired from the position detection electrode becomes equal to or greater than the position detection threshold value. Thus, the pressing force generated by the pointer can be detected with greater accuracy.

In the second configuration, the controller may further include a smoothing processing unit configured to, after the signal value acquired from the position detection electrode becomes equal to or greater than the position detection threshold value, acquire a smoothed value of a pressing force value based on the latest signal value acquired from the pressing force detection electrode and a pressing force value based on a signal value acquired from the pressing force detection electrode at a point in time before a point in time when the latest signal value was acquired, and the rate of change acquisition unit may be configured to acquire the rate of change of the smoothed value (third configuration).

According to the above-described third configuration, even when the pressing force value fluctuates due to noise, since the pressing force value is smoothed, it is possible to prevent erroneous detection of the pressing force of the pointer due to noise.

In the third configuration, the smoothing processing unit may be configured to acquire a smoothed value Zs represented by Equation (1) below, where a point in time when a signal value acquired from the position detection electrode becomes equal to or greater than the position detection threshold value is a first point in time, Z1 is a pressing force value based on a signal value acquired from the pressing force detection electrode at an N-th point in time that is a natural number N times of the unit time from the first point in time, and Z2 is a pressing force value based on the signal value acquired from the pressing force detection electrode at a point in time one unit time before the N-th point in time (fourth configuration).

$$Zs = \{(N-1)/N\} \times Z2 + (1/N) \times Z1 \quad (1)$$

Here, the present inventors discovered that, when the average value of the pressing force value Z1 and the pressing force value Z2 is simply acquired as a smoothed value, the effect of reducing the influence of noise reduces as the point in time is closer to the first point in time (N is smaller). Thus, according to the above-described fourth configuration, a point in time closer to the first point in time (N is small) is more strongly smoothed, and thus influence of noise can be reduced even immediately after the first point in time and erroneous detection of the pressing force of the pointer due to noise can be prevented.

In any one of the first to fourth configurations, the controller may include a pressing force detection unit configured to detect the pressing force generated by the pointer when the rate of change of the pressing force value or the rate of change of the smoothed value of the pressing force value becomes equal to or greater than the pressing force detection threshold value, and configured to detect the release of the pressing force generated by the pointer when the rate of change of the pressing force value or the rate of change of the smoothed value of the pressing force value becomes equal to or less than a pressing force release detection threshold value, which is smaller than the pressing force detection threshold value, after detecting the pressing force generated by the pointer (fifth configuration).

According to the above-described fifth configuration, the pressing force of the pointer can be easily detected by comparing the rate of change with the pressing force detection threshold, and the release of the pressing force of the pointer can be easily detected by comparing the rate of change with the pressing force release detection threshold value.

In any one of the first to fifth configurations, the controller includes: a signal acquisition unit configured to acquire, for each unit time, signal values from each of the position detection electrode and the pressing force detection electrode; a pressing force value acquisition unit configured to acquire a latest pressing force value based on a latest signal value acquired from the pressing force detection electrode and a past pressing force value based on a past signal value acquired from the pressing force detection electrode at a point in time before a natural number d times the unit time from a point in time when the latest signal value was acquired; and a rate of change acquisition unit configured to acquire the rate of change of the pressing force value by subtracting the past pressing force value from the latest pressing force value, or acquire the rate of change of the smoothed value of the pressing force value by subtracting a past smoothed value pressing force value from the smoothed value of the latest pressing force value (sixth configuration). In the sixth configuration, the controller may further include a differential time interval setting unit configured to set a value of the natural number d based on an input operation from the operator (seventh configuration).

According to the above-described sixth configuration, the rate of change of the pressing force value or the rate of change of the smoothed value can be easily acquired. According to the seventh configuration, the value of the natural number d can be arbitrarily set. For example, in a case where the absolute value (signal) of the rate of change is set to be larger, the natural number d may be set to be larger, and in a case where the load on the memory is set to be reduced, the natural number d is set be smaller.

In any one of the first to seventh configurations, the controller may include: a signal acquisition unit configured to acquire, for each unit time, signal values from each of the position detection electrode and the pressing force detection electrode; and a correction processing unit configured to perform a process of multiplying the rate of change of the pressing force value by a correction value other than 1, or perform a process of multiplying the rate of change of the smoothed value of the pressing force value by a correction value other than 1, in a predetermined correction period from a point in time when the signal value acquired from the position detection electrode becomes equal to or greater than the position detection threshold value (eighth configuration).

Here, in a case where the touch panel is at a low temperature or a high temperature, since the temperature difference between the pointer and the touch panel is large, thermal noise is likely to be added to the rate of change for a certain period from a point in time when the signal value becomes equal to or greater than the position detection threshold value. In contrast, according to the above-described eighth configuration, since the rate of change can be corrected in the correction period, the influence of thermal noise can be reduced even when the touch panel is at a low temperature or a high temperature.

In the eighth configuration, a dielectric disposed between the drive electrode and the position detection electrode and between the drive electrode and the pressing force detection electrode may be further included, and the controller may include: a temperature acquisition unit configured to acquire a capacitance value of the dielectric and acquire an environmental temperature for correction based on the capacitance value of the dielectric; and a correction value determination unit configured to determine the correction value based on the environmental temperature for correction (ninth configuration). In the eighth configuration, a temperature detection unit configured to detect the environmental temperature for correction may be further included, and the controller may further include a correction value determination unit configured to acquire the environmental temperature for correction from the temperature detection unit and determine the correction value based on the environmental temperature for correction (tenth configuration).

According to the above-described ninth or tenth configuration, the appropriate correction value can be determined by detecting whether the touch panel is at a low temperature or a high temperature based on the environmental temperature for correction. As a result, the influence of thermal noise can be effectively reduced when the touch panel is at a low temperature or a high temperature. According to the above-described ninth configuration, the environmental temperature for correction can be acquired by using an existing dielectric for acquiring the environmental temperature in the touch panel, without newly providing a temperature detector (temperature sensor).

Another embodiment of the present disclosure is a display device including: the touch panel system according to any one of the first to tenth configurations; and a display configured to display an image, and provided with a touch panel disposed on a display surface of the display (eleventh configuration).

Another embodiment of the present disclosure is a method for controlling a touch panel system including an electrostatic capacitance type touch panel including a drive electrode, a position detection electrode, and a pressing force detection electrode, the method including: providing a drive signal to the drive electrode; acquiring signal values from each of the position detection electrode and the pressing force detection electrode; detecting a position of a pointer based on the signal value acquired from the position detection electrode; and acquiring a pressing force generated by the pointer based on a rate of change of a pressing force value based on the signal value acquired from the pressing force detection electrode or a rate of change of a smoothed value of the pressing force value (twelfth configuration).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A touch panel system comprising:
an electrostatic capacitance type touch panel including a drive electrode, a position detection electrode, and a pressing force detection electrode; and
a controller configured to provide a drive signal to the drive electrode and acquire signal values from each of the position detection electrode and the pressing force detection electrode,
wherein the controller detects a position of a pointer based on the signal value acquired from the position detection electrode, and acquires a pressing force generated by the pointer based on a rate of change of a pressing force value based on the signal value acquired from the pressing force detection electrode or a rate of change of a smoothed value of the pressing force value,
wherein the controller includes:
a signal acquisition unit configured to acquire, for each unit time, signal values from each of the position detection electrode and the pressing force detection electrode;
a position detection unit configured to detect the position of the pointer when the signal value acquired from the position detection electrode becomes equal to or greater than a position detection threshold value continuously a plurality of times; and
a rate of change acquisition unit configured to acquire the rate of change of the pressing force value or the rate of change of the smoothed value of the pressing force value from a point in time when the signal value acquired from the position detection electrode becomes equal to or greater than the position detection threshold value.

2. The touch panel system according to claim 1, wherein the controller further includes a smoothing processing unit configured to, after the signal value acquired from the position detection electrode becomes equal to or greater than the position detection threshold value, acquire a smoothed value of a pressing force value based on a latest signal value acquired from the pressing force detection electrode and a pressing force value based on a signal value acquired from the pressing force detection electrode at a point in time before a point in time when the latest signal value was acquired, and
the rate of change acquisition unit is configured to acquire the rate of change of the smoothed value.

3. The touch panel system according to claim 2, wherein the smoothing processing unit is configured to acquire a smoothed value Zs represented by Equation (1):

$$Zs = \{(N-1)/N\} \times Z2 + (1/N) \times Z1, \quad (1)$$

where a point in time when a signal value acquired from the position detection electrode becomes equal to or greater than a position detection threshold value is a first point in time, Z1 is a pressing force value based on a signal value acquired from the pressing force detection electrode at a N-th point in time that is a natural number N times of the unit time from the first point in time, and Z2 is a pressing force value based on the signal value acquired from the pressing force detection electrode at a point in time one unit time before the N-th point in time.

4. The touch panel system according to claim 1, wherein the controller further includes a pressing force detection unit configured to detect the pressing force generated by the pointer when the rate of change of the pressing force value or the rate of change of the smoothed value of the pressing force value becomes equal to or greater than the pressing force detection threshold value, and configured to detect release of the pressing force generated by the pointer when the rate of change of the pressing force value or the rate of change of the smoothed value of the pressing force value becomes equal to or less than a pressing force release detection threshold value, which is smaller than the pressing force detection threshold value, after detecting the pressing force generated by the pointer.

5. The touch panel system according to claim 1, wherein
the signal acquisition unit is further configured to acquire, for each unit time, signal values from each of the position detection electrode and the pressing force detection electrode,
the controller further includes a pressing force value acquisition unit configured to acquire a latest pressing force value based on a latest signal value acquired from the pressing force detection electrode, and a past pressing force value based on a past signal value acquired from the pressing force detection electrode at a point in time before a natural number d times the unit time from a point in time when the latest signal value was acquired, and the rate of change acquisition unit is further configured to acquire the rate of change of the pressing force value by subtracting the past pressing force value from the latest pressing force value, or acquire the rate of change of the smoothed value of the pressing force value by subtracting the past smoothed value pressing force value from the smoothed value of the latest pressing force value.

6. The touch panel system according to claim 5, wherein the controller further includes a differential time interval setting unit configured to set a value of the natural number d based on an input operation from an operator.

7. The touch panel system according to claim 1, wherein
the controller further includes a correction processing unit configured to perform a process of multiplying the rate of change of the pressing force value by a correction value other than 1, or perform a process of multiplying the rate of change of the smoothed value of the pressing force value by a correction value other than 1, in a predetermined correction period from a point in time when the signal value acquired from the position detection electrode becomes equal to or greater than the position detection threshold value.

8. The touch panel system according to claim 7, wherein the touch panel system further includes a dielectric disposed between the drive electrode and the position detection electrode and between the drive electrode and the pressing force detection electrode, and
the controller further includes:
a temperature acquisition unit configured to acquire a capacitance value of the dielectric and acquire an environmental temperature for correction based on the capacitance value of the dielectric; and
a correction value determination unit configured to determine the correction value based on the environmental temperature for correction.

9. The touch panel system according to claim 7,
wherein the touch panel system further includes a temperature detection unit configured to detect an environmental temperature for correction, and
the controller further includes a correction value determination unit configured to acquire the environmental temperature for correction from the temperature detection unit, and determine the correction value based on the environmental temperature for correction.

10. A display device comprising:
the touch panel system according to claim 1; and
a display configured to display an image,
wherein the touch panel is disposed on a display surface of the display.

11. A method for controlling a touch panel system including an electrostatic capacitance type touch panel including a drive electrode, a position detection electrode, and a pressing force detection electrode, the method comprising:
providing a drive signal to the drive electrode;
acquiring signal values from each of the position detection electrode and the pressing force detection electrode;
detecting a position of a pointer based on the signal value acquired from the position detection electrode;
acquiring a pressing force generated by the pointer based on a rate of change of a pressing force value based on the signal value acquired from the pressing force detection electrode or a rate of change of a smoothed value of the pressing force value;
acquiring, for each unit time, signal values from each of the position detection electrode and the pressing force detection electrode;
detecting the position of the pointer when the signal value acquired from the position detection electrode becomes equal to or greater than a position detection threshold value continuously a plurality of times; and
acquiring the rate of change of the pressing force value or the rate of change of the smoothed value of the pressing force value from a point in time when the signal value acquired from the position detection electrode becomes equal to or greater than the position detection threshold value.

* * * * *